(12) United States Patent
Takebe et al.

(10) Patent No.: US 7,704,570 B2
(45) Date of Patent: Apr. 27, 2010

(54) POLARIZING PLATE AND LIQUID CRYSTAL DISPLAY APPARATUS USING THE SAME

(75) Inventors: Takashi Takebe, Kawasaki (JP); Kunio Shimizu, Otsuki (JP); Shigeki Oka, Kunitachi (JP)

(73) Assignee: Konica Minolta Opto, Inc., Tokyo (JP)

( * ) Notice: Subject to any disclaimer, the term of this patent is extended or adjusted under 35 U.S.C. 154(b) by 184 days.

(21) Appl. No.: 11/509,724

(22) Filed: Aug. 25, 2006

(65) Prior Publication Data

US 2007/0048459 A1    Mar. 1, 2007

(30) Foreign Application Priority Data

Aug. 30, 2005    (JP) .............................. 2005-249042

(51) Int. Cl.
 *G02B 5/30* (2006.01)
 *G02F 1/1335* (2006.01)

(52) U.S. Cl. .................. 428/1.3; 428/1.31; 349/96; 349/122; 349/117; 106/171.1

(58) Field of Classification Search ................ 428/1.3, 428/1.31, 1.33, 1.54–1.55; 349/96, 122; 349/117–118; 106/171.1, 182.1, 184.3
See application file for complete search history.

(56) References Cited

U.S. PATENT DOCUMENTS 4,023,977 A * 5/1977 Mercurio et al. ............ 523/448
2002/0102369 A1 * 8/2002 Shimizu et al. ............. 428/1.33
2003/0020208 A1 * 1/2003 Tasaka et al. ............... 264/217
2003/0170482 A1 * 9/2003 Murakami ................... 428/615
2003/0215608 A1 * 11/2003 Bermel ........................ 428/141
2004/0247889 A1 * 12/2004 Nakajima et al. .......... 428/423.1

OTHER PUBLICATIONS

First Office Action issued on Jun. 26, 2009 from the Chinese Patent Office in corresponding Application No. 2006800312986.

* cited by examiner

*Primary Examiner*—Sophie Hon
(74) *Attorney, Agent, or Firm*—Finnegan, Henderson, Farabow, Garrett & Dunner, L.L.P.

(57) ABSTRACT

A polarizing plate includes two transparent supports A and B; and a polarizer sandwiched between the two transparent supports A and B; wherein (i) the transparent support A is a stretched cellulose ester film (a) which contains a non-phosphoric acid ester plasticizer and substantially does not contain a phosphoric acid ester plasticizer, and wherein (ii) the transparent support B is a stretched cellulose ester film (b) which has a retardation value $R_0$ of from 0 nm to 10 nm and a retardation value $R_t$ of from −30 nm to 20 nm, and the retardation value $R_0$ and the retardation value $R_t$ are defined by the following formulas (I) and (II):

$Ro = (nx - ny) \times d$    Formula (I):

$Rt = \{(nx + ny)/2 - nz\} \times d.$    Formula (II):

11 Claims, No Drawings

POLARIZING PLATE AND LIQUID CRYSTAL DISPLAY APPARATUS USING THE SAME

This application is based on Japanese Patent Application No. 2005-249042 filed on Aug. 30, 2005, in Japanese Patent Office, the entire content of which is hereby incorporated by reference.

BACKGROUND OF THE INVENTION

The present invention relates to a polarizing plate and a liquid crystal display apparatus using the same, particularly to a liquid crystal display apparatus of transverse electric field switch mode.

In response to an increasing level of performance and definition of the liquid crystal display apparatus, a polarizing plate protective film used in the polarizing plate is required to meet various requirements.

A film made of cellulose ester is employed as a polarizing plate protective film of commonly used liquid crystal display apparatus. To manufacture the cellulose ester film, a solution casting method is generally utilized in order to ensure flatness. The refractive index along the thickness tends to reduce relative to the refractive index of the film inner surface.

Patent Document 1 describes the cellulose ester film whose optical anisotropy is reduced by addition of an ethylenic polymer. The film with reduced Rt has been found out to easily cause deterioration of the polarizer after a long-term use.

The polarizing plate is required to provide excellent characteristics in dimensional stability and retardation stability subsequent to a long-term use or exposure to high temperature or high humidity since it has a serious impact on the display performance (viewing angle, tint and gradation) of the liquid crystal display. In particular, the polarizing plate is required to have superb dimensional stability in the direction of the absorption axis of the polarizer, and prominent resistance to deterioration of the polarizer If there is much dimensional variation of the polarizing plate subsequent to a long-term use or exposure to high temperature or high humidity, stress will occur between the polarizing plate and agglutinant or liquid crystal cell bonded through the agglutinating layer, a so-called light leakage occurs wherein a white patch will occur at the time of black display It has been found in particular that a phenomenon such as the aforementioned light leakage, reduction in contrast and variations in visibility such as color shift occur to the liquid crystal display apparatus of transverse electric field switching mode (hereinafter referred to as "IPS type") due to generation of a vast amount of heat from the backlight, when the polarizing plate containing a cellulose ester film with the reduced optical anisotropy as mentioned above is utilized, or the liquid crystal display apparatus has been subjected to a long-term use or adjustment of the screen brightness. This has required prompt action to be taken for improvement.

[Patent Document 1] Japanese Non-Examined Patent Publication 2003-12859

SUMMARY OF THE INVENTION

The object of the present invention is to solve the aforementioned problem and to provide a cellulose ester film for ensuring excellent dimensional stability of polarizing plate despite long-term durability treatment or severe durability treatment under high temperature and humidity, this cellulose ester film being characterized by freedom from light leakage and a high degree of retardation stability at the time of humidity variation. The present invention is also intended to provide a polarizing plate using the aforementioned cellulose ester film characterized by highly stabilized viewing angle, as well as an IPS type liquid crystal display apparatus such as IPS or FFS.

The object of the present invention can be achieved by the following Structures:

(1) A polarizing plate wherein a polarizer is sandwiched between two transparent supports A and B, the aforementioned polarizing plate characterized in that:

(i) the aforementioned transparent support A is a stretched cellulose ester film (a) containing a non-phosphoric acid ester plasticizer, without virtually containing a phosphoric acid ester plasticizer; and (ii) the aforementioned transparent support B is a stretched cellulose ester film (b), wherein the retardation value Ro defined by the following Formula (I) is 0 through 10 nm, and the retardation value Rt defined by the following Formula (II) is −30 through 20 nm.

$$Ro = (nx - ny) \times d \qquad \text{Formula (I):}$$

$$Rt = \{(nx + ny)/2 - nz\} \times d \qquad \text{Formula (II):}$$

where nx denotes the refractive index in the direction of the slow phase axis inside the film surface, ny indicates the refractive index in the direction of the fast phase axis inside the film surface, nz represents the refractive index along the film thickness, and d shows the film thickness (nm).

(2) The polarizing plate of the aforementioned Structure (1) wherein the aforementioned transparent support B is a stretched cellulose ester film (b), wherein the retardation value Ro defined by the following Formula (I) is 0 through 5 nm, and the retardation value Rt defined by the following Formula (II) is −10 through 10 nm.

(3) The polarizing plate of the aforementioned Structure (1) or (2) wherein the aforementioned transparent support B contains the polymer obtained by polymerization of an ethylenic unsaturated monomer, the aforementioned polymer having a weight average molecular weight of 500 or more without exceeding 30000.

(4) The polarizing plate of the aforementioned Structure (1) or (2) wherein the aforementioned polymer B contain acryl polymer having a weight average molecular weight of 500 or more without exceeding 30000.

(5) The polarizing plate of the aforementioned Structure (4) wherein the aforementioned acryl polymer contains 30% by mass or more of methyl acrylate ester monomer unit.

(6) The polarizing plate of the aforementioned Structure (4) wherein the aforementioned acryl polymer contains 2 through 20% by mass of acrylic acid or methacrylic acid ester monomer unit including a hydroxyl group.

(7) The polarizing plate of the aforementioned Structure (4) wherein the aforementioned acryl polymer contains a hydroxyl group on at least one terminus of the principal chain.

(8) The polarizing plate of the aforementioned Structure (4) wherein the aforementioned acryl polymer contains two types of polymer—polymer X and polymer Y.

(9) The polarizing plate of the aforementioned Structure (1) wherein the non-phosphoric acid ester plasticizer contained in the aforementioned transparent support A is selected from among the polyvalent carboxylic acid ester plasticizer, glycolate plasticizer, phthalic acid ester plasticizer, fatty acid ester plasticizer and polyvalent alcohol ester plasticizer, polyester plasticizer, and polymer plasticizer.

(10) The polarizing plate of the aforementioned Structure (1) wherein at least one of the plasticizers contained in the aforementioned transparent support A is a polyvalent alcohol ester plasticizer.

(11) The polarizing plate of the aforementioned Structure (1) wherein the aforementioned transparent support B contains at least one of the plasticizers selected from among the polyvalent alcohol ester plasticizer, polyester plasticizer and acryl polymer plasticizer.

(12) The polarizing plate of the aforementioned Structure (1) wherein the aforementioned transparent supports A and B have a film thickness of 10 through 70 μm.

(13) A liquid crystal display apparatus wherein the polarizing plate described in any one of the aforementioned Structures (1) through (12) is provided on the surface thereof.

(14) The liquid crystal display apparatus of transverse electric field switching mode described in the aforementioned Structure (13).

The present invention provides a cellulose ester film for ensuring excellent dimensional stability of polarizing plate despite long-term durability treatment or severe durability treatment under high temperature and humidity, wherein this cellulose ester film is further characterized by freedom from light leakage and a high degree of retardation stability at the time of humidity variation. The present invention also provides a polarizing plate using the aforementioned cellulose ester film characterized by highly stabilized angle of visibility, as well as an IPS type liquid crystal display apparatus such as IPS or FFS.

DETAILED DESCRIPTION OF THE PREFERRED EMBODIMENT

The following describes the details of the best form of embodiment of the present invention without the present invention being restricted thereto:

The polarizing plate of the present invention is characterized in that a polarizer is sandwiched between two transparent supports A and B, wherein:

(i) the aforementioned transparent support A is a stretched cellulose ester film (a) containing a non-phosphoric acid ester plasticizer, without virtually containing a phosphoric acid ester plasticizer; and (ii) the aforementioned transparent support B is a stretched cellulose ester film (b), wherein the retardation value Ro defined by the following Formula (I) is 0 through 10 nm, and the retardation value Rt defined by the following Formula (II) is −30 through 20 nm.

$$Ro = (nx - ny) \times d \quad \text{Formula (I):}$$

$$Rt = \{(nx + ny)/2 - nz\} \times d \quad \text{Formula (II):}$$

where nx denotes the refractive index in the direction of the slow phase axis inside the film surface, ny indicates the refractive index in the direction of the fast phase axis inside the film surface, nz represents the refractive index along the film thickness, and d shows the film thickness (nm).

The present inventors have made efforts to achieve the aforementioned object and have succeeded in finding out that, if one of the polarizing plate protective films sandwiching the polarizer is a stretched cellulose ester film containing a non-phosphoric acid ester plasticizer, without virtually containing a phosphoric acid ester plasticizer, and the other is a stretched cellulose ester film with reduced optical anisotropy, then the polarizing plate to be produced is characterized by excellent dimensional stability, freedom from light leakage and a high degree of retardation stability at the time of humidity variation.

The following describes the details of the present invention:

(Transparent Support A)

The substrate of the transparent support A of the present invention is a cellulose ester film, and preferably contains a cellulose ester film having a Mw/Mn value of 1.4 through 3.0. In the process of producing a cellulose ester, it is difficult to make the Mw/Mn value less than 1.4. The cellulose ester of uniform molecular weight can be obtained by fractioning through gel filtration, but this is not preferred due to economical disadvantages. If the Mw/Mn value exceeds 3.0, the effect of maintaining the flatness will be reduced, which is not preferred. The more preferable Mw/Mn value is 1.7 through 2.2.

The number average molecular weight (Mn) of the cellulose ester is preferably 80000 through 200000.

In the case of greater molecular weight of the cellulose ester and poorer distribution of molecular weight, elution of the added plasticizer and ultraviolet absorber will be difficult and the advantages of the present invention is estimated to be produced. This advantage is estimated to be further improved when the molecule of the cellulose ester is oriented in the transverse direction by biaxial orientation. The overall acyl group replacement ratio of the cellulose ester is 2.6 through 3.0, especially 2.7 through 2.9, and a proper proportion of hydroxyl group remains unreplaced in the cellulose principal chain. These facts are considered to prevent the plasticizer and ultraviolet absorber from being leached by hydrogen bondage. Although there is no particular restriction to the type of the plasticizer to be used, a phosphoric acid ester plasticizer conventionally employed so far must not be included virtually or substantially. The expression "not included virtually" means that the content of the phosphoric acid ester plasticizer relative to the overall solids in the cellulose ester film is less than 1% by mass, preferably less than 0.1% by mass, more preferably less than 0% by mass (less than detection limit).

The cellulose ester film of the present invention preferably includes the non-phosphoric acid ester plasticizer, and this plasticizer is preferably selected from among the citric acid ester plasticizer, glycolate plasticizer, phthalic acid ester plasticizer, fatty acid ester plasticizer, polyvalent alcohol ester plasticizer, polyester plasticizer, and acrylic plasticizer. When the phosphoric acid ester plasticizer is included, the phosphoric acid ester plasticizer as well as other plasticizers tend to leach out, and most of plasticizer is removed from the cellulose ester, with the result that the characteristics of the polarizing plate protective film tend to deteriorate.

Hereinafter, the present invention will be explained in detail.

The number average molecular weight (Mn) of the cellulose ester used in the present invention is preferably from 80,000 to 200,000, more preferably from 100,000 to 200,000 and still more preferably from 150,000 to 200,000.

The ratio of molecular weight distribution Mw/Mn of the cellulose ester used in the present invention is preferably from 1.4 to 3.0 and more preferably from 1.7 to 2.2.

The average molecular weight and the molecular weight distribution can be determined by any well known method in the art using high-speed liquid chromatography, a number average molecular weight and a weight average molecular weight are calculated utilizing the same and the ratio (Mw/Mn) thereof can be determined.

The measurement conditions are as follows:
Solvent: methylene chloride
Column: Shodex K806, K805, K803G (three columns of products by Showa Denko K. K. were utilized in a junction)
Column temperature: 25° C.
Sample concentration: 0.1 percent by weight
Detector: RI Model 504 (produced by GL Science Co.)
Pump: L6000 (produced by Hitachi, Ltd.)
Flow rate: 1.0 ml/min
Calibration curve: calibration curves based on 13 samples of standard polystyrene STK, standard polystyrene (manufactured by Tosoh Corp.) Mw=500 to 1,000,000, were utilized. The intervals among the 13 samples should be almost equal.

The cellulose ester used in the present invention is a carboxylate ester having from 2 to 22 carbon atoms, and specifically, a lower fatty acid ester of a cellulose is preferably used. The lower fatty acid represents one having carbon atoms of 6 or fewer, including, for example: cellulose acetate, cellulose propionate, cellulose butyrate, cellulose acetate phthalate and mixed fatty acid esters of for example: cellulose acetatepropionate and cellulose acetatebutyrate disclosed in JP-A 10-45804, JP-A 8-231761, and U.S. Pat. No. 2,319,052. Or, an ester of an aromatic carboxylic acid and a cellulose and a cellulose acylrate described in Japanese Patent O.P.I. Publication No. 2002-179701, Japanese Patent O.P.I. Publication No. 2002-265639, and Japanese Patent O.P.I. Publication No. 2002-265638 are also preferably used. Among these, as a lower-fatty-acid ester of a cellulose used especially preferably, cellulose triacetate, cellulose acetatepropionate and Cellulose acetate butyrate are specifically preferable. These cellulose esters are preferably also used in combination.

For a cellulose ester used for a transparent support A, one with a total acyl substitution degree from 2.6 to 3.0 is preferably used. Although, for a cellulose ester used for a transparent support B, one with a total acyl substitution degree from 2.8 to 3.0 is preferably used, a cellulose ester having the similar characteristics of the cellulose ester used for the transparent support A other than this point can be used.

Another preferable cellulose ester besides cellulose triacetate, is one having an acyl group with from 2 to 4 carbon atoms as a substituent, and simultaneously satisfying the following formulas (a) and (b) when X represents the substitution degree of an acetyl group, while Y represent the substitution degree of a propionyl group or a butyryl group:

$2.6 \leq X+Y \leq 3.0$ Formula (a)

$0 \leq X \leq 2.95$ Formula (b)

Especially, cellulose acetate propionate with $1.5 \leq X \leq 2.95$ and $0.1 \leq Y \leq 1.5$ (while X+Y corresponds to the total acyl substitution degree) is preferable. A hydroxyl group remains in the part where acyl substitution is not carried out. These esters may be prepared through any well known method in the art.

An acyl substitution degree can be determined through a method prescribed in ASTM-D817-96.

Cellulose ester can be prepared using cotton linter, wood pulp or kenaf as starting materials which may be used alone or in combination. It is particularly preferable to use a cellulose ester prepared from cotton linter (hereafter described merely as linter) or from wood pulp.

These cellulose esters may also be used by mixing with each other in any ratio. In case, an acid anhydride (acetic anhydride, propionic anhydride, and butyric anhydride) is used as an acylation agent, cellulose ester can be prepared through a common reaction using an organic acid such as acetic acid and an organic solvent such as methylene chloride, in the presence of a protic catalyst such as sulfuric acid.

In the case of an acetyl cellulose, it is necessary to prolong the acetylation duration in order to obtain a higher degree of acetylation, however, a too long acetylation duration may result in a undesirable reaction such as cutting off of a polymer chain or a decomposition of an acyl group. Accordingly, the acetylation duration should be limited within an appropriate range, however, specifying a degree of acetylation with an acetylation duration is not fully recommended because the acetylation conditions differ when a different reactor or different equipment is utilized. In general, during decomposition of a polymer, the distribution of the molecular weight increases, so that, also in the case of a cellulose ester, the degree of decomposition can be specified by the commonly used Mw/Mn value, where Mw represents a weight average molecular weight and Mn denotes a number average molecular weight. Namely, the Mw/Mn value can be used as one of the parameters representing the degree of acetylation reaction at which the decomposition of the polymer has not been excessive and, at the same time, sufficient acetylation has already been achieved.

An example of a preparation method of cellulose ester is described below. Cotton linter of 100 weight parts as a starting material of cellulose was crushed, and after adding 40 weight parts of acetic acid, the system was pretreated for activation at 36° C. for 20 minutes. Thereafter, 8 weight parts of sulfuric acid, 260 weight parts of acetic anhydride and 350 weight parts of acetic acid were added, after which esterification was performed at 36° C. for 120 minutes. The system was saponification ripened at 63° C. for 35 minutes after being neutralized with 11 weight parts of 24% magnesium acetate aqueous solution to obtain acetyl cellulose. After the system was stirred with adding ten times of an acetic acid solution (acetic acid/water=1/1, based on weight ratio) at ambient temperature for 160 minutes, the resulting solution was filtered and dried to obtain a purified acetyl cellulose having an acetyl substitution degree of 2.75. The obtained acetyl cellulose exhibited Mn of 92,000, Mw of 156,400, and Mw/Mn of 1.7. In a similar manner, cellulose esters having different substitution degrees and different Mw/Mn ratios can be synthesized by controlling the esterification conditions of cellulose ester (temperature, duration and stirring rate) as well as hydrolysis conditions.

Incidentally, with regard to the synthesized cellulose ester, removal of low molecular weight component by refining and removal of non-acetized component by filtering from the prepared cellulose ester are also preferably carried out.

Further, a cellulose ester of mixed acids can be prepared by a reaction employing the method described in JP-A 10-45804. The acyl substitution degree can be measured according to the definition of ASTM-D817-96.

The properties of a cellulose ester are influenced by residual amounts of metal components which may be originated from the water used in the manufacturing process. Metal components which may cause insoluble cores should preferably be minimal. Metal ions of iron(Fe), calcium(Ca), magnesium(Mg) and other metals may form insoluble cores by forming salts in combination with decomposition products of polymers which may possibly contain organic acid groups. Accordingly these metal ions should be minimal. The amount of iron is preferably less than 1 ppm. Calcium is contained in a considerable quantity in groundwater or in river water, and an appreciable quantity of which forms hard water. Calcium easily forms a coordinated compound, namely a complex, with acid components such as carbonic acid, sulfuric acid, or with various ligands, and causes much insoluble scum (insoluble residue and turbidity).

The preferable amount of calcium is commonly less than 60 ppm, and is more preferably from 0 to 30 ppm. Too much magnesium may also cause insoluble residue, and the preferable amount is from 0 to 70 ppm, more preferably from 0 to 20 ppm. After an absolutely dry cellulose ester film is treated with a microdigest wet-decomposer (sulfuric acid-nitric acid decomposing) followed by being subjected to alkali fusion, the amounts of iron, calcium, magnesium are determined by means of IPC-AES (Inductively Coupled Plasma-Atomic Emission Spectroscopy).

The cellulose ester film used in the transparent support A of the present invention does not virtually include the phosphoric acid ester plasticizer such as triphenyl phosphate. The expression "does not virtually include" means that the content of the phosphoric acid ester plasticizer is less than 1% by mass, preferably 0.1% by mass, more preferably 0% by mass.

The plasticizers are not specifically limited, however, they may be selected from, for example: a multivalence carboxylic acid ester type plasticizer, a glycolate type plasticizer, a phthalate ester plasticizer, a fatty-acid-ester type plasticizer and a polyhydric alcohol ester type plasticizer, a polyester type plasticizer, an acrylics type plasticizer, etc. At least one of the plasticizers is preferably a polyalcohol ester type plasticizer, when two types or more plasticizers are used.

A polyalcohol ester used as a plasticizer in the present invention is an ester prepared from a monocarboxylic acid and an aliphatic polyalcohol having a valence of 2 or more. It preferably contains an aromatic ring or a cycloalkyl ring in the molecule. An aliphatic polyalcohol ester having the valence of from 2 to 20 is preferably used.

A polyalcohol used in the present invention is represented by formula (1):

$$R_1-(OH)_n \qquad \text{Formula (1)}$$

Wherein: $R_1$ represents an organic acid having a valence of n, n represents a positive integer of 2 or more and bH represents an alcoholic and/or a phenolic hydroxyl group.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

Specifically, triethylene glycol, tetraethylene glycol, dipropylene glycol, tripropylene glycol, sorbitol, trimethylolpropane and xylitol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives.

Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and derivatives thereof, of these, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester.

To be used for a polyalcohol ester, carboxylic acid may be used alone or in combination of two or more carboxylic acids. Hydroxyl groups in a polyalcohol may be completely esterified or only partially esterified remaining unsubstituted hydroxyl groups.

Specific examples of polyalcohol esters are shown below:

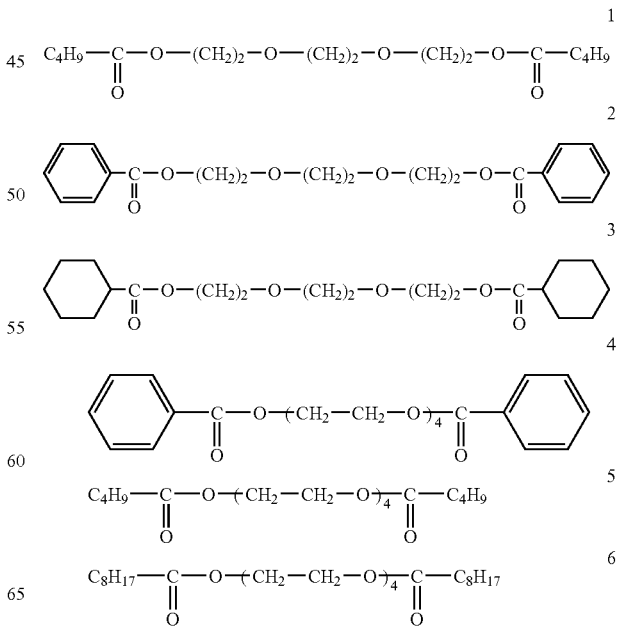

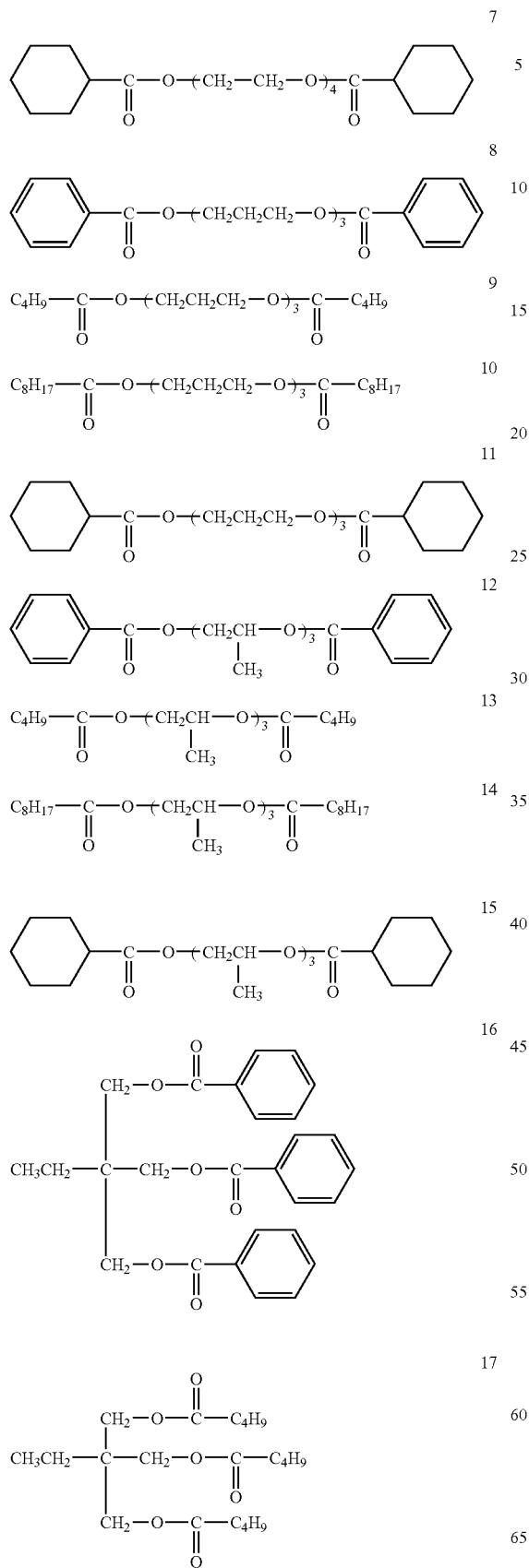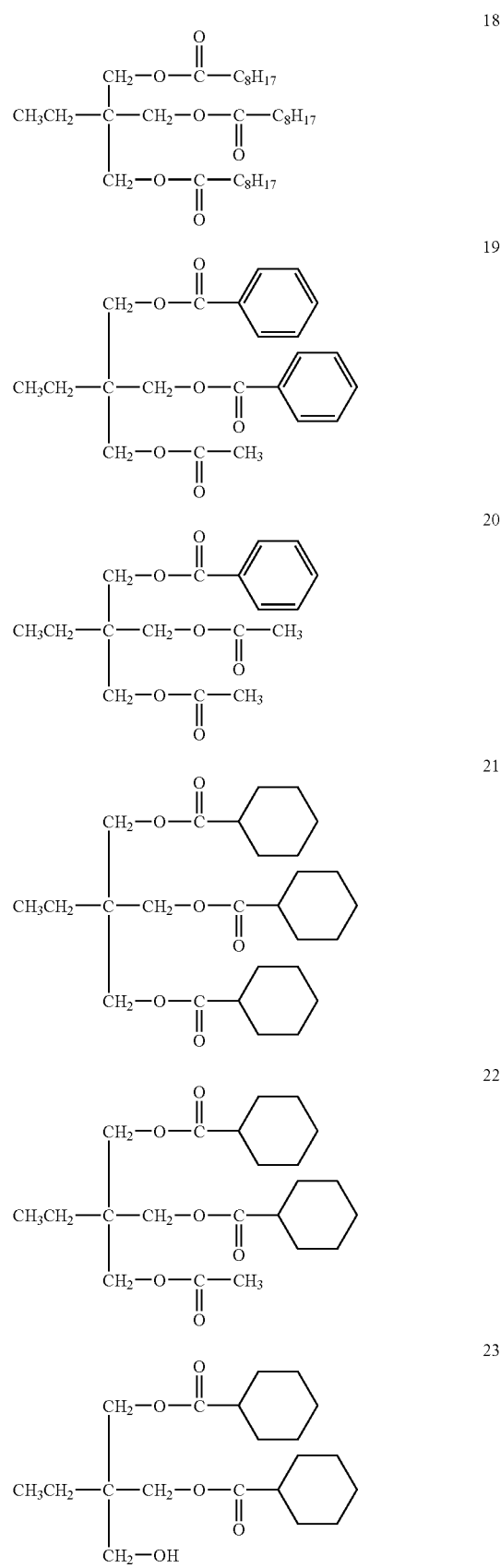

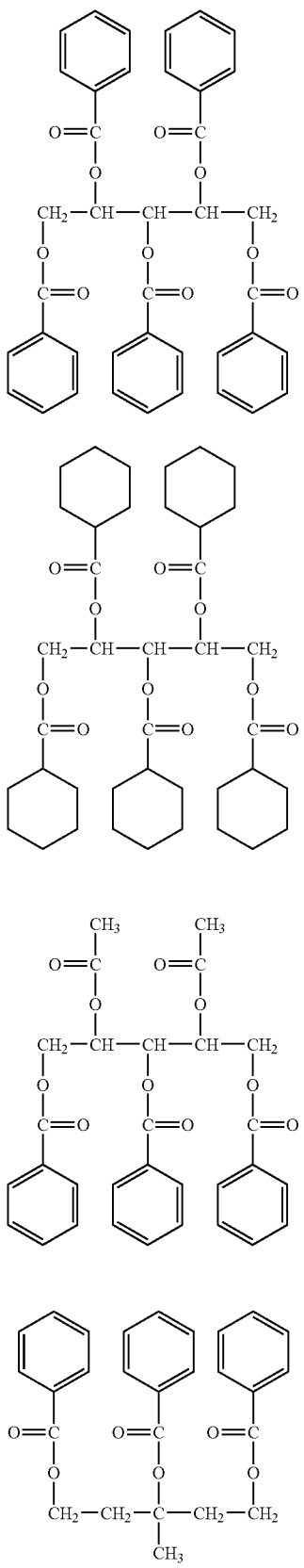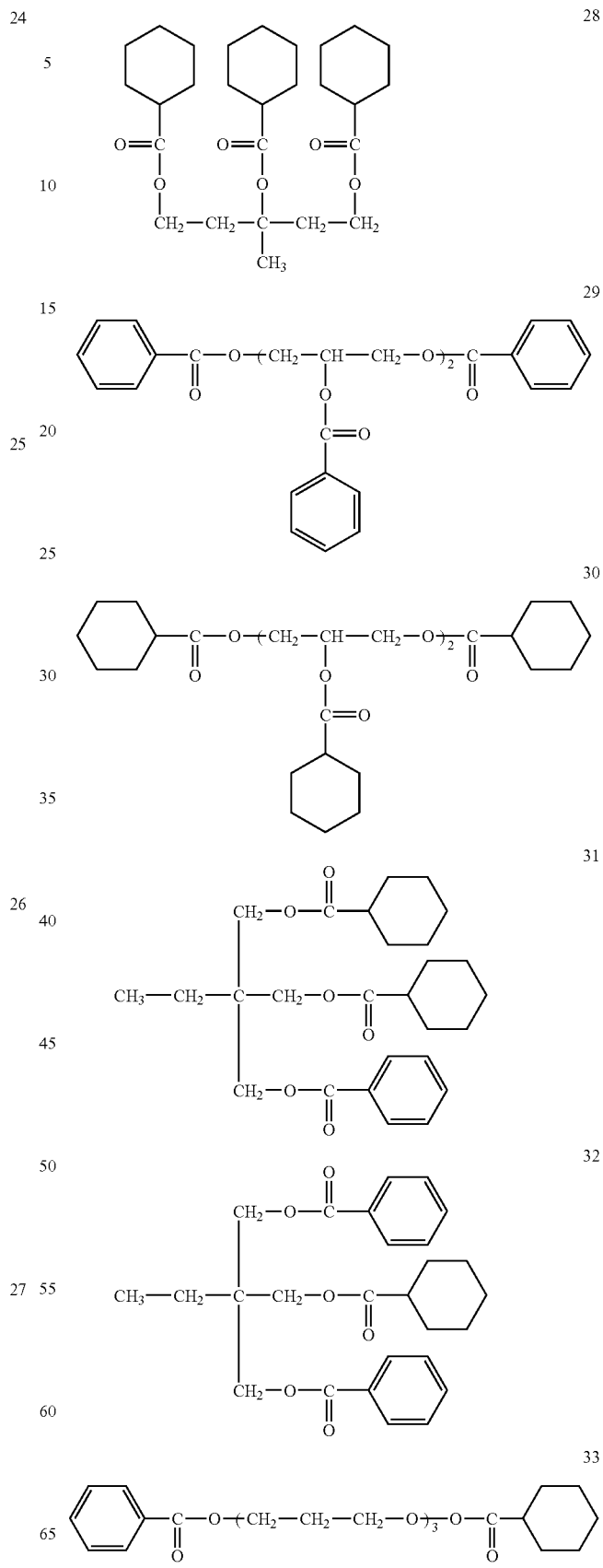

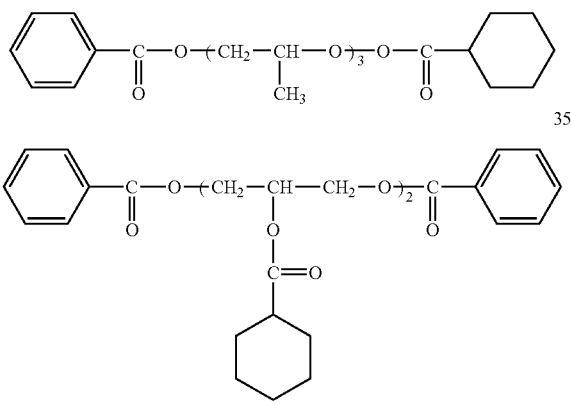

A glycolate ester type plasticizer is not specifically limited, however, an alkylphthalylalkyl glycolate type is preferably used, which include, for example: methylphthalylmethyl glycolate, ethylphthalylethyl glycolate, propylphthalyl-propyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalic ester type plasticizer includes, for example: diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

A citrate ester type plasticizer includes, for example: acetyltrimethyl citrate, acetyltriethyl citrate and acetyltributyl citrate.

A fatty acid ester type plasticizer includes, for example: butyl oleate, methylacetyl ricinoleate and dibutyl sebacate.

A phosphoric ester type plasticizer includes, for example: triphenyl phosphate, tricresyl phosphate, cresylphenyl phosphate, octyldiphenyl phosphate, diphenylbiphenyl phosphate, trioctyl phosphate and tributyl phosphate. However, the cellulose ester film used in the present invention does not include a substantial amount of phosphate ester. As described above, the expression "does not include a substantial amount" means that the amount of an included phosphate ester is less than 1 percent by weight, more preferably less than 0.1 percent by weight, and most preferably, contains no phosphate ester.

The transparent support B may include a phosphoric acid ester plasticizer. In this case, however, the content of the phosphoric acid ester plasticizer is preferably less than 1% by mass, more preferably 0.1% by mass, still more preferably 0% by mass.

As described above, inclusion of a phosphoric acid ester plasticizer is not preferred since the substrate is easily deformed when an actinic radiation curable resin is formed.

Polyvalence carboxylic acid type plasticizers useful for the present invention is ester composed of polyvalence carboxylic acid of divalence or more valence, preferably divalence to 20 valence and alcohol. Moreover, aliphatic polyvalence carboxylic acid is desirably 2-20 valence, and aromatic polyvalence carboxylic acid and alicyclic polyvalence carboxylic acid is desirably 3-20 valence.

The polyvalence carboxylic acid used for the present invention is expressed with the following general formula (2).

$$R_2(COOH)_m(OH)_n \qquad \text{General formula (2)}$$

(Here, $R_2$ represents an organic group of (m+n) valence, m is a positive integer of two or more, and n is an integer of zero or more, COOH group represents a carboxyl group and OH group represents alcoholic or phenol hydroxyl group)

Although the following, for example, can be mentioned as an example of desirable polyvalence carboxylic acid, the present invention is not limited to these.

Aromatic polyvalence carboxylic acid of 3 or more valence or or its derivative such as trimellitic acid, trimesic acid, and pyromellitic acid, aliphatic polyvalence carboxylic acid such as succinic acid, adipic acid, azelaic acid, sebacic acid, oxalic acid, fumaric acid, maleic acid and tetra-hydronalium phthalic acid, and oxi-polyvalence carboxylic acid such as tartaric acid, tartronic acid, malic acid, and citric acid etc. can be used preferably. Especially, it is desirable to use oxi-polyvalence carboxylic acid from the aspect of the enhancement for retention properties.

There is no restriction in particular for alcohol used for the polyvalence carboxylic acid ester compound of the present invention, and well-known alcohol and phenol can be used. For example, aliphatic saturated alcohol or aliphatic unsaturated alcohol with normal chain or side chain having carbon atom number of 1 to 32 can be used preferably. The number of carbon atoms is more preferably from 1 to 20 and still more preferably from 1 to 10. Moreover, alicyclic alcohol and its derivative such as cyclopentanol and cyclohexanol, and aromatic alcohol and its derivative such as benzyl alcohol and cinnamyl alcohol can be used preferably.

When using oxi-polyvalence carboxylic acid as polyvalence carboxylic acid, the alcoholic or phenol hydroxyl group of the oxi-polyvalence carboxylic acid may be esterified by using monocarboxylic acid. Although the following can be mentioned as an example of desirable monocarboxylic acid, the present invention is not limited to these.

For aliphatic monocarboxylic acids, normal or branched fatty acids having from 1 to 32 carbon atoms are preferably used. The number of carbon atoms is more preferably from 1 to 20 and still more preferably from 1 to 10.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and derivatives thereof. Specifically, acetic acid, propionic acid and benzoic acid are preferred.

The molecular weight of the monocarboxylic acid ester is not limited, however, the molecular weight is preferably from 300 to 1000 and more preferably from 350 to 750. A higher molecular weight is preferable in respect of the improvement in retention properties, while a lower molecular weight is preferable with respect to moisture permeability, or to mutual solubility with cellulose ester.

The number of kinds of alcohol used for the polyvalence carboxylic acid ester used for the present invention may be one kind, and a mixture of two or more kinds.

The acid number of a polyvalence carboxylic acid ester compound used for the present invention is desirably 1 mgKOH/g or less, and more desirably 0.2 mgKOH/g or less. Since the environmental variation of retardation can be suppressed, it is desirable to make the acid number into the above-mentioned range.

(Acid Number, Hydroxyl Value)

An acid number is defined as a milligram value of potassium hydroxide required to neutralize an acid (carboxyl group which exists in a sample) contained in 1 g of a sample. A hydroxyl value is defined as a milligram value of a potassium hydroxide required to neutralize an acetic acid combined with a hydroxyl group when 1 g of a sample is made to acetylate. The acid number and the hydroxyl value are measured based on JIS K0070.

Although the examples of an especially desirable polyvalence carboxylic acid ester compound are shown below, the present invention is not limited to these. For example, triethyl citrate, tributyl citrate, acetyl triethyl citrate (ATEC), acetyl tributyl citrate (ATBC), benzoyl tributyl citrate, acetyl triphenyl citrate, acetyl tri benzyl citrate, dibutyl tartrate, tartaric acid diacetyl dibutyl, trimellitic acid tributyl, pyromellitic acid tetra-butyl, etc. may be listed.

The polyester plasticizer used in the present invention is not specifically limited, however, a polyester plasticizer which has an aromatic ring or a cycloalkyl ring in the molecule are applicable. As a preferable polyester plasticizer, for example, an aromatic terminal ester plasticizer represented by the following Formula (3) are preferably used:

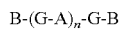 Formula (3)

B-(G-A)$_n$-G-B where B represents benzene monocarboxylic acid group, G represents an alkylene glycol group having 2-12 carbon atoms, an aryl glycol group having 6-12 carbon atoms, or an oxyalkylene glycol group having 4-12 carbon atoms, A represents an alkylene dicarboxylic acid having 4-12 carbon atoms, or an aryl dicarboxylic acid group having 6-12 carbon atoms, and n represents an integer of 1 or more.

A compound represented by Formula (3) is structured by benzene monocarboxylic acid group represented with B, an alkylene glycol group or an oxyalkylene glycol group or an aryl glycol group represented with G, and an alkylene dicarboxylic acid group or an aryl dicarboxylic acid group represented with A and is prepared through a reaction similar to the preparation reaction of a common polyester plasticizer.

Examples of a benzene monocarboxylic acid component of the ester plasticizer of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the ester plasticizer of the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols. Since alkylene glycol having carbon atoms of 2-12 is especially excellent in compatibility with cellulose ester, it is especially desirable.

Examples of an oxyalkylene glycol component having 4-12 carbon atoms of the aromatic terminal ester of the present invention include: diethylene glycol, triethylene glycol, tetraethylene glycol, dipropylene glycol and tripropylene glycol, which may be used alone or in combination of two or more glycols.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids. Examples of an arylene dicarboxylic acid component having 6-12 carbon atoms include: phthalic acid, terephthalic acid, 1,5-naphthalene dicarboxylic acid and 1,4-naphthalene dicarboxylic acid.

The number average molecular weight of the ester plasticizer used in the present invention is preferably 300-1500, and more preferably 400-1000. The acid value of the ester plasticizer used in the present invention is preferably not more than 0.5 mgKOH/g and more preferably not more than 0.3 mgKOH/g. The hydroxyl value of the ester plasticizer used in the present invention is preferably not more than 25 mgKOH/g and more preferably not more than 15 mgKOH/g.

Examples of a synthetic method of an aromatic terminal ester plasticizer are shown below:

<Sample No. 1 (Aromatic Terminal Ester Sample)>

In a container, 410 parts of phthalic acid, 610 parts of benzoic acid, 737 parts of dipropylene glycols and 0.40 parts of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated to 100 Pa and, finally, to 4.0×10² Pa at 200-230° C., while the distillate was removed. The product was filtered to obtain an aromatic terminal ester type plasticizer having the following features:

| | |
|---|---|
| Viscosity (25° C., mPa · s): | 43400 |
| Acid value: | 0.2 |

<Sample No. 2 (Aromatic Terminal Ester Sample)>

An aromatic terminal ester having the following features was prepared in the same manner as Sample No. 1 except that 410 parts of phthalic acid, 610 parts of benzoic acid, 341 parts of ethylene glycol and 0.35 parts of tetra-isopropyl titanates (as a catalyst) were used.

| | |
|---|---|
| Viscosity (25° C., mPa · s): | 31000 |
| Acid value: | 0.1 |

<Sample No. 3 (Aromatic Terminal Ester Sample)>

An aromatic terminal ester having the following features was prepared in the same manner as Sample No. 1 except that 410 parts of phthalic acid, 610 parts of benzoic acid, 418 parts of 1,2-dihydroxypropane and 0.35 parts of tetra-isopropyl titanates (as a catalyst) were used.

| | |
|---|---|
| Viscosity (25° C., mPa·s): | 38000 |
| Acid value: | 0.05 |

<Sample No. 4 (Aromatic Terminal Ester Sample)>

An aromatic terminal ester having the following features was prepared in the same manner as Sample No. 1 except that 410 parts of phthalic acid, 610 parts of benzoic acid, 418 parts of 1,3-dihydroxypropane and 0.35 parts of tetra-isopropyl titanates (as a catalyst) were used.

| | |
|---|---|
| Viscosity (25° C., mPa·s): | 37000 |
| Acid value: | 0.05 |

Although concrete compounds of the aromatic teminal ester type plasticizer according to the present invention are shown below, the present invention is not limited to these.

(1)

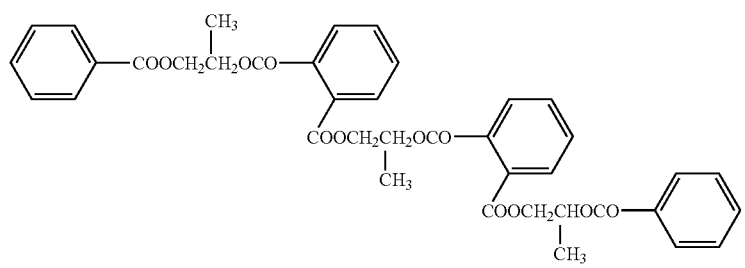

Mw: 696

(2)

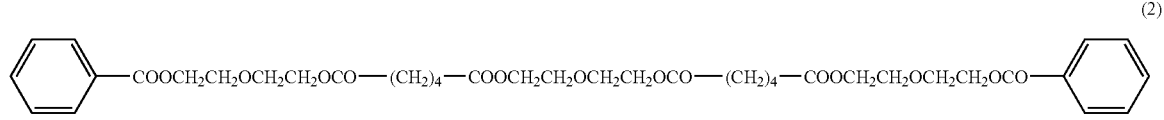

Mw: 746

(3)

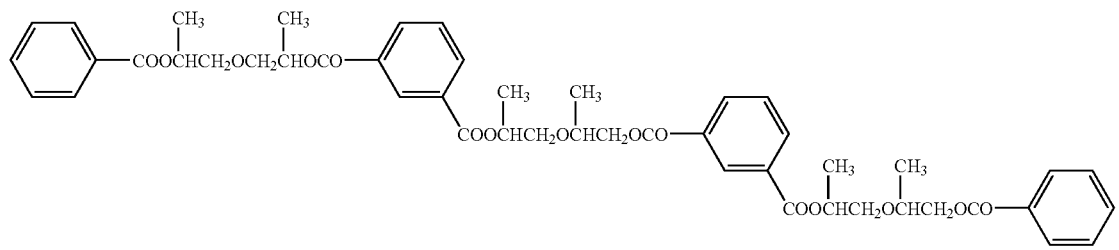

Mw: 830

(4)

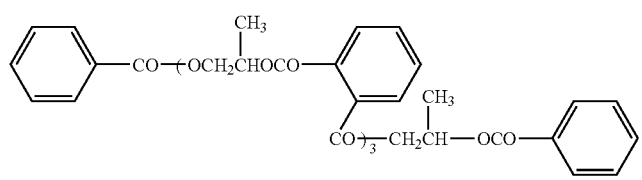

Mw: 886

(5)

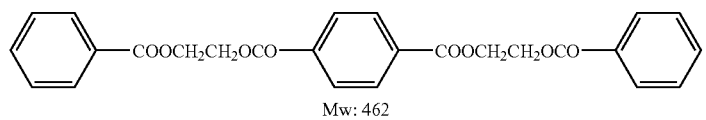

Mw: 462

(6)

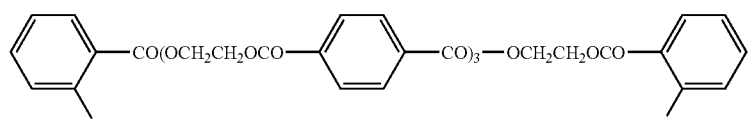

Mw: 874

-continued

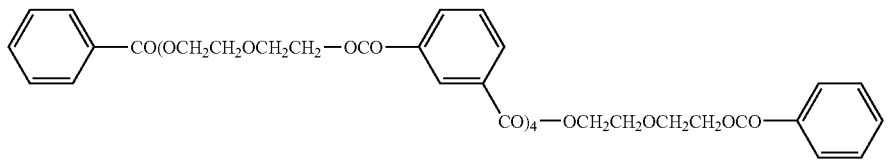
Mw: 1258 (7)

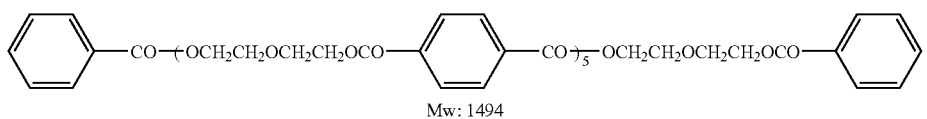
Mw: 1494 (8)

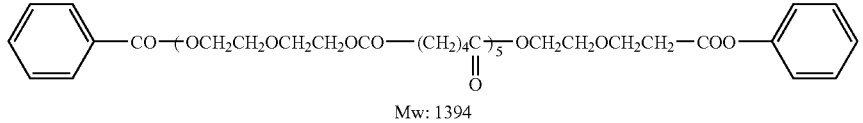
Mw: 1394 (9)

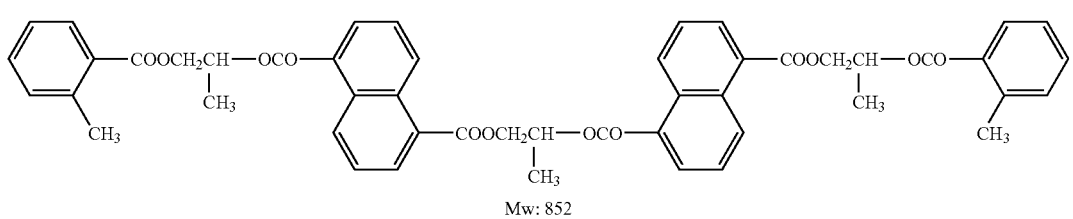
Mw: 852 (10)

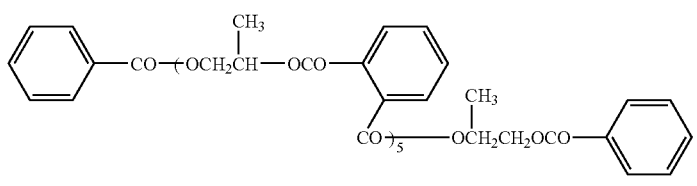
Mw: 1314 (11)

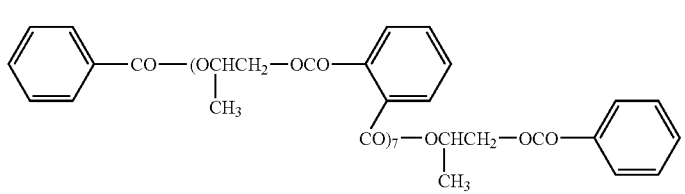
Mw: 1726 (12)

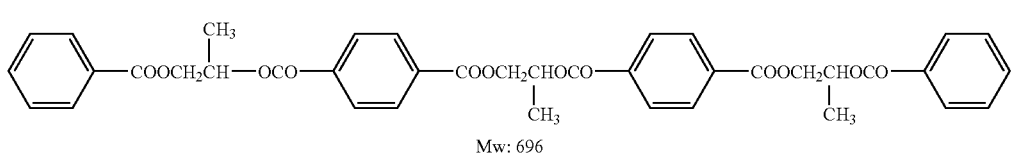
Mw: 696 (13)

It may be preferable that a cellulose ester film according to the present invention contains the following polymer type plasticizer.

(Polyester)

(Polyester Represented by General Formula (4) or (5))

It may be preferable that a cellulose ester film according to the present invention contains polyester represented by general formula (4) or (5).

$B_1\text{-}(G\text{-}A\text{-})_m G\text{-}B_1$  General formula (4):

$B_2\text{-}(A\text{-}G\text{-})_n A\text{-}B_2$  General formula (5):

In Formula 4 and 5, $B_1$ is a monocarboxylic component, $B_2$ is a monoalcohol component, G is a di-valent alcohol component and A is a di-basic acid component; the polyester is synthesized by these components. The components $B_1$, $B_2$, G and A are each characterized in that these components contain no aromatic ring, and m and n are each represents repeating number.

Further, in Formula 4 and 5, $B_1$ and $B_2$ at left and right sides are may be the same or may be different from each other respectively.

As the carboxylic acid represented by $B_1$, a known aliphatic or alicyclic monocarboxylic acid can be used without any limitation.

Though the followings can be described as examples of preferable monocarboxylic acid, the invention is not limited to them.

As the aliphatic monocarboxylic acid, an aliphatic acid having a straight chain or a branched chain each containing from 1 to 32 carbon atoms is preferably applied. The number of the carbon atoms is preferably from 1 to 20 and more preferably from 1 to 12. The inclusion of acetic acid is preferable because the compatibility with the cellulose ester is increased and mixing of acetic acid and another monocarboxylic acid is also preferable.

Examples of preferable monocarboxylic acid include a saturated aliphatic acid such as formic acid, acetic acid, propionic acid, butylic acid, valeric acid, capronic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachinic acid, behenic acid, lignocelic acid, cerotic acid, heptaconic acid, montanic acid, melicic acid and laccelic acid, and a unsaturated aliphatic acid such as undecylenic acid, oleic acid, sorbic acid, linolic acid, linolenic acid and arachidonic acid.

As the alcohol component represented by $B_2$, a known alcohol can be applied without any limitation. For example, a saturated or unsaturated aliphatic alcohol having a straight or branched chain containing from 1 to 32 carbon atoms can be applied. The number of the carbon atoms is preferably from 1 to 20 and more preferably from 1 to 12.

As the di-valent alcohol represented by G, the followings can be cited but the invention is not limited to them. Examples of the di-valent alcohol include ethylene glycol, diethylene glycol, 1,2-propylene glycol, 1,3-propylene glycol, 1,2-butylene glycol, 1,3-butylene glycol, 1,4-butylene glycol, 1,5-pentanediol, 1,6 hexanediol, 1,5-pentylene glycol, diethylene glycol, triethylene glycol and tetraethylene glycol. Among them, ethylene glycol, 1,2-propylene glycol, 1,3-propylene glycol, 1,2-butylene glycol, 1,3-butylene glycol, 1,4-butylene glycol, 1,4-hexandiol, diethylene glycol and triethylene glycol are preferable, and 3-propylene glycol, 1,4-butylene glycol, 1,6-hexanediol and diethylene glycol are further preferably applied.

As the di-basic acid (dicarboxylic acid) represented by A, aliphatic and alicyclic di-basic acids such as malonic acid, succinic acid, glutaric acid, adipic acid, pimelic acid, suberic acid, azelaic acid, sebacic acid, undecanedicarboxylic acid and dodecanedicarboxylic acid are preferably applicable. Particularly, at least one selected from ones having from 4 to 12 carbon atoms is used. Two or more kinds of the carboxylic acid may be used in combination.

m and n are each the repeating number which is preferably from 1 to 170.

(Polyester Represented by General Formula (6) or (7))

It may be preferable that a cellulose ester film according to the present invention contains polyester represented by general formula (6) or (7).

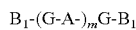   General formula (6):

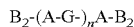   General formula (7):

In Formula (6) and (7), $B_1$ is a monocarboxylic component having carbon atoms of 1 to 12, $B_2$ is a monoalcohol component having carbon atoms of 1 to 12, G is a di-valent alcohol component having carbon atoms of 2 to 12 and A is a di-basic acid component having carbon atoms of 2 to 12; the polyester is synthesized by these components. The components $B_1$, $B_2$, G and A are each characterized in that these components contain no aromatic ring, and m and n are each represents repeating number.

Further, in Formula 6 and 7, $B_1$ and $B_2$ at left and right sides are may be the same or may be different from each other respectively.

$B_1$ and $B_2$ are synonymous with $B_1$ and $B_2$ in the above-mentioned general formula (4) or (5).

G and A are an alcoholic compositions having carbon atoms of 2-12 and a di-base acid composition having carbon atoms of 2-12 in G and A in the above-mentioned general formula (4) or (5).

The weight average molecular weight of the polyester is preferably not more than 20,000 and more preferably not more than 10,000. The polyester having a weight average molecular weight of from 500 to 10,000 shows good compatibility with the cellulose ester and is not evaporated in the film forming process.

The condensation polymerization of the polyester is carried out by an ordinary method. For example, the polyester can be easily synthesized by a method by directive reaction of the di-basic acid with the glycol, a thermally melting condensation method by polyesterization reaction or ester-exchanging reaction of the di-basic acid or its alkyl ester such as methyl ester of the di-basic acid with the glycol, or a method by dehydrohalogenation reaction of a acid chloride of such the acid with the glycol. The polyester having a weight average molecular weight not so large is preferably synthesized by the direct reaction method. The polyester having a molecular weight distribution rising in the low molecular weight side shows very high compatibility with the cellulose ester so that the cellulose ester film having low moisture permeability and high transparency can be obtained. A known method can be applied without any limitation for controlling the molecular weight. For example, the molecular weight can be controlled under a suitable reacting condition by controlling the adding amount of a mono-valent acid or alcohol in a method for blocking the terminal of the molecular by the mono-valent acid or the mono-valent alcohol. In such the case, the use of the mono-valent acid is preferable from the viewpoint of the stability of the polymer. For the acid, ones which are difficulty distillated out from the system during the polymerization-condensation reaction and easily distillated out after the reaction such as acetic acid, propionic acid and butylic acid are selected. These acids may be used in a mixed state. In the case of the direct reaction, the molecular weight can be controlled by stopping the reaction suitable timing according to the amount of water distillated out from the system during the reaction. Moreover, the control can be carried out by biasing the charging mole number of the glycol or the di-basic acid or by controlling the reaction temperature.

It is desirable to contain the polyester according to the present invention in 1-40% by mass for a cellulose ester, and it is desirable to contain the polyester expressed with a general formula (6) or (7) in 2-30% by mass. Especially, it is desirable to contain 5-15% by mass.

By using a film with to which polyester was added, a polarizing plate with little deterioration due to high-temperature and high humidity is obtained. Moreover, by using this polarizing plate, a transverse electric field driving type display device which is excellent in surface flatness while maintaining a high contrast and a wide viewing angle for a long period of time, is obtained.

(Acryl Type Polymer)

(Acryl Type Polymer)

It may be preferable that a cellulose ester film according to the present invention contains an acryl type polymer.

By using a film to which an acrylics type polymer was added, a polarizing plate in which a polarizer deterioration due to high-temperature and high humidity has been improved sharply is obtained. Moreover, by using this polarizing plate, high contrast is maintained for a more long period of time, and since a change of a polarizing plate in dimensions is remarkable improved even under an inferior environment, corner unevenness does not occur.

In the invention, the acryl type polymer is a homopolymer or a copolymer synthesized from a monomer such as acrylic acid or methacrylic acid alkyl ester having no aromatic ring in the molecular thereof.

Examples of the methacrylic acid alkyl ester monomer having no aromatic ring include methyl acrylate, ethyl acrylate, i- or n-propyl acrylate, n-, i-, s- or t-butyl acrylate, n-, i- or s-pentyl acrylate, n- or i-hexyl acrylate, n- or i-heptyl acrylate, n- or i-octyl acrylate, n- or i-nonyl acrylate, n- or i-myristyl acrylate, 2-ethylhexyl acrylate, ε-caprolactone acrylate, 2-hydroxyethyl acrylate, 2-hydroxypropyl acrylate, 3-hydroxypropyl acrylate, 4-hydroxybutyl acrylate, 2-hydroxybutyl acrylate, 2-methoxyethyl acrylate and 2-ethoxyethyl acrylate, and the above-mentioned in each of which the acrylate is replaced by methacrylate.

In the case of that the acryl type polymer is a copolymer, it is preferable that the copolymer composed of a monomer component X having a hydrophilic group and a monomer component Y having no hydrophilic group and a mole ratio of X:Y is from 1:1 to 1:99. Within this range, it is desirable that the degradation of the polarization element is small when the film is used in the polarization plate. The content of the acryl polymer is preferably from 1 to 20% by weight of the cellulose ester.

The acryl type polymer having a weight average molecular weight of from 500 to 30,000 displays good compatibility with the cellulose ester and is hardly volatiled during the film formation. An acryl type polymer having an acryl type polymer as a side chain is gives excellent transparency and extremely low moisture permeability to the cellulose ester film when the molecular weight of such the polymer is from 500 to 10,000. The film shows superior properties for the polarization plate protective film.

The above acryl type polymer can be synthesized referring the method described in Tokkai 2003-12859.

(Weight Average Molecular Weight)

In the present invention, the weight average molecular weight (Mw) of a polyester and an acryl polymer can be measured by a usual method using GPC (Gel Permeation Chromatography). Concretely, the measurement was conducted in such a way that the temperature of a column (SHO-DEX-K806-K803, made by Showa Denko K.K.) was made into 25 degrees C., a methylene chloride was used as an eluting solution, a flow quantity was made into 1.0 ml/min, detection R1 and an injection rate were set to 100 μl, a sample concentration was set to 0.1 (a mass/capacity %), and a polystyrene was used as a standard reference.

As for the total content of a plasticizer in a cellulose ester film, 3-40 mass % to the total amount of solid content are desirable, and 5-20 mass % is still more desirable. Moreover, the content in the case of using two kinds of plasticizers is at least 1 or more % by mass respectively, and preferably each is contained two or more % by mass respectively.

<UV Absorbing Agent>

The cellulose ester film of the present invention includes a UV absorbing agent in order to increase a durability of the film by absorbing UV rays having a wavelength less than 400 nm. The transmittance at a wavelength of 370 nm is preferably not more than 10 percent and is more preferably not more than 5 percent and still more preferably not more than 2 percent.

For example, oxybenzophenone type compounds, benzotriazol type compounds, saricylate ester type compounds, benzophenone type compounds, cyanoacrylate type compounds, triazine type compounds, nickel complex salt type compounds and inorganic particles are included, however, the present invention is not limited thereto.

For example: 5-chloro-2-(3,5-di-sec-butyl-2-hyroxylphenyl)-2H-benzotriazole, (2-2H-benzotriazole-2-ile)-6-(straight chain and side chain dodecyl)-4-methylphenyl, 2-hydroxy-4-benziloxybenzophenone, and 2,4-benziloxybenzophenone; and TINUVIN 109, TINUVIN 171, TINUVIN 234, TINUVIN 326, TINUVIN 327 and TINUVIN 328 which are manufactured by Chiba Specialty Chemicals Co.

Further, examples of the UV absorbing agents preferably used in the present invention include a benzotriazole UV absorbing agent, a benzophenone UV absorbing agent and a triazine UV absorbing agent, of these, a benzotriazole UV absorbing agent, a triazine UV absorbing agent is specifically preferable.

For example, as a benzotriazole UV absorbing agent, the compound represented by the following Formula (A) is applicable.

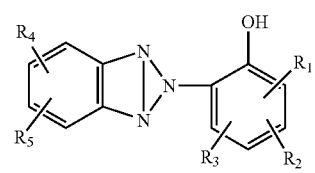

Formula (A)

wherein $R_1$, $R_2$, $R_3$, $R_4$, and $R_5$ may be the same or may be different, and each represent a hydrogen atom, a halogen atom, a nitro group, a hydroxyl group, an alkyl group, an alkenyl group, an aryl group, an alkoxy group, an acyloxyl group, an aryloxy group, an alkylthio group, an arylthio group, a mono or di alkylamino group, an acylamino group, or a heterocyclic group of 5-6 member; and R4 and R5 may be combined to form a 5-6 membered ring.

Each of the above mentioned groups may have an arbitrary substituent.

Examples of a benzotriazole UV absorbing agent used for the present invention is given to below, however, the present invention is not limited thereto.

UV-1: 2-(2'-hydroxy-5'-methylphenyl) benzotriazole

UV-2: 2-(2'-hydroxy-3',5'-di-tert-butylphenyl) benzotriazole

UV-3: 2-(2'-hydroxy-3'-tert-butyl-5'-methylphenyl) benzotriazole

UV-4: 2-(2'-hydroxy-3',5'-di-tert-butylphenyl)-5-chloro benzotriazole

UV-5: 2-(2'-hydroxy-3'-(3",4",5",6"-tetrahydro phthalimidomethyl)-5'-methylphenyl) benzotriazole UV-6: 2,2-methylenebis(4-(1,1,3,3-tetramethylbutyl)-6-(2H-benzotriazole-2-yl) phenol)

UV-7: 2-(2'-hydroxy-3'-tert-butyl-5'-methylphenyl)-5-chlorobenzotriazole

UV-8: 2-(2H-benzotriazole-2-yl)-6-(n- and iso-dodecyl)-4-methylphenol (TINUVIN171, product of Ciba Specialty Chemicals Inc.)

UV-9: Mixture of octyl-3-[3-tert-butyl-4-hydroxy-5-(chloro-2H-benzotriazole-2-yl) phenyl]propionate and 2-ethylhexyl-3-[3-tert-butyl-4-hydroxy-5-(5-chloro-2H-benzotriazole-2-yl) phenyl]propionate (TINUVIN109)

As a benzotriazole UV absorbing agent, the compound represented by the following Formula (B) is preferably used.

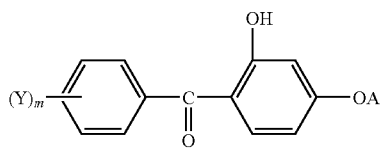

Formula (B)

wherein Y represents a hydrogen atom, a halogen atom, an alkyl group, an alkenyl group, an alkoxyl group, or a phenyl group, of these, the alkyl group, the alkenyl group, and the phenyl group may have a substituent; A represents a hydrogen atom, an alkyl group, an alkenyl group, a phenyl group, a cycloalkyl group, an alkylcarbonyl group, an alkylsulfonyl group, or —CO(NH)n-1-D group, wherein D represents an alkyl group, an alkenyl group or a phenyl group which may have a substituent; and m and n each represent 1 or 2.

In the above description, the alkyl group represents, for example, a normal or branched aliphatic group having not more than 24 carbon atoms, the alkoxyl group represents, for example, an alkoxyl group having not more than 18 carbon atoms, and the alkenyl group represents, for example, an alkenyl group having not more than 16 carbon atoms, such as an allyl group or a 2-butenyl group. Examples of a substituent to the alkyl group, the alkenyl group, and the phenyl group include, for example: a halogen atom such as a chlorine atom, a bromine atom and a fluorine atom, a hydroxyl group and a phenyl group (the phenyl group may further have an alkyl group or a halogen atom as a substituent).

Specific examples of a benzophenone related compound represented by Formula (B) are shown below, however, the present invention is not limited thereto.

UV-10: 2, 4-dihydroxy benzophenone
UV-11: 2,2'-dihydroxy-4-methoxybenzophenone
UV-12: 2-hydroxy-4-methoxy-5-sulfobenzophenone
UV-13: Bis(2-methoxy-4-hydroxy-5-benzoylphenyl) methane)

In addition, a disk-shaped compound mentioned later may be used preferably as a ultraviolet absorber.

It may be preferable that a cellulose ester film according to the present invention contains a ultraviolet absorber of two kinds or more.

A high molecular ultraviolet absorber is also used preferably as the ultraviolet absorber. Especially the polymer type ultraviolet absorber disclosed in the Official Gazette of Japanese Patent Tokkaihei 6-148430 is preferably used.

The method of adding the ultraviolet absorber is described below: One way is to dissolve the ultraviolet absorber in such an organic solvent as alcohol, methylene chloride and dioxolane. Then dope is added. Another way is to add it directly in the dope composition. In the case of the inorganic powder or the like that does not melt in the organic solvent, it is dispersed in the organic solvent and cellulose ester using a dissolver and sand mill, and then the dope is added.

The amount of the ultraviolet absorber to be used varies depending on the type of the compound and operating condition. If the thickness of the dried cellulose ester film is 30 through 200 μm, 0.5 to 4.0% by mass for a cellulose ester film may be preferable, 0.6 to 2.0% by mass may be more preferable.

<Microparticles>

The cellulose ester film of the present invention preferably contains microparticles.

Microparticles may be inorganic, for example: silicon dioxide, titanium dioxide, aluminum oxide, zirconium oxide, calcium carbonate, talk, clay, calcined kaolin, calcined calcium silicate, hydrated calcium silicate, aluminum silicate, magnesium silicate or calcium phosphate. Microparticles containing silicon are preferable in respect to decreasing turbidity, and silicon dioxide is specifically preferable.

The mean diameter of primary particles is preferably from 5 to 50 nm, and more preferably from 7 to 20 nm. The particle should preferably exist as an aggregated secondary particle of a diameter from 0.05 to 0.3 μm. The content of the particle in a cellulose ester film is preferably from 0.05 to 1 percent by weight, and is more preferably from 0.1 to 0.5 percent. In a multi-layered cellulose ester film prepared by a co-casting method, a major part of the particles should preferably exist near the surface.

Microparticle of silicon dioxide available on the market include, for example: AEROSIL R972, R927V, R974, R812, 200, 200V, 300, R202, OX50, TT600 and which are manufacture by Nippon Aerosil Co., Ltd.

Microparticles of zirconium oxide available on the market include, for example: AEROSIL R976 and R811 manufacture by Nippon Aerosil Co., Ltd.

Microparticles of polymer available on the market include, for example: silicone resin, fluorine-contained resin and acryl resin. Among these, silicone resin, especially three dimensionally networked silicone resin is preferably used. Examples of silicone resins include: TOSPERL 103, 105, 108, 145, 3120 and 240, which are manufactured by Toshiba Silicone Co., Ltd.

Among the microparticles listed above, AEROSIL 200V and AEROSIL R972V are particularly preferable with respect to exhibiting a lower friction coefficient while the low turbidity is maintained. Kinetic friction coefficient of the rear side of a hard coat layer in the present invention is preferably not more than 1.0.

<Dyes>

In order to optimize color of the cellulose ester film, dyes may preferably be added. For example, a blue dye may be added to reduce a yellow hue of the film. Preferable are anthraquinone type dyes.

The anthraquinone type dye may have any of several kinds of substituents in any of the 8 positions of anthraquinone. Preferable substituents are an aniline group, a hydroxyl group, an amino group, a nitro group and a hydrogen atom. Blue dyes disclosed in JP-A 2001-154017, particularly anthraquinone type dyes, are preferably added to the film.

Additives described above may be added to a dope containing cellulose ester via batch mixing, or, alternatively, they may be added via in-line mixing using a dissolving solvent of the additives. Specifically, microparticles are preferably added, partially or entirely via an in-line mixing, in order to reduce a load to a filter.

In an in-line mixing process of additive solutions, a smaller amount of cellulose ester is preferably dissolved in the dope in order to obtain a sufficiently mixed dope. The amount of cellulose ester is preferably from 1 to 10 weight parts in 100 weight parts of solvent, and more preferably from 3 to 5 weight parts.

As a mixer for in-line addition and mixing, for example, a static mixer manufactured by Toray Engineering Co., Ltd. or a static type in-line mixer High-Mixer SWJ manufactured by Toray Industries, Inc., is preferably used.

<Manufacturing Method of Cellulose Ester>

Next, a manufacturing method of the cellulose ester of the present invention will be explained. Here, a manufacturing method common for both the transparent supports A and B will be explained.

The manufacturing method of the cellulose ester film in the present invention comprises a dope preparing step in which cellulose ester and additives are dissolved in solvents, a flow-casting step in which a dope is flow-cast on a continuously running endless metal support, a drying process in which a flow-cast dope is dried to form a web, a peeling step in which a dried web is peeled from a metal support, a stretching step in both the longitudinal and the lateral directions, a further drying step and a winding step of the resulting film.

In the dope preparing step, a higher content of cellulose ester in the dope is preferable since duration of the drying step following the flow-casting step is shortened, however, a too high content may result in loss of filtration accuracy. Preferable content of cellulose ester is from 10 to 35 percent by weight and more preferably from 15 to 25 percent.

A solvent may be used alone, however, two or more solvents may also be used together. A mixture of a good solvent and a poor solvent is more preferably used to increase manufacturing efficiency. A mixed solvent being rich in a good solvent is preferable to increase solubility of the cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester even. Sometimes, a solvent works as a good solvent of a cellulose ester, and sometimes as a poor solvent depending on the average acetification degree (degree of acetyl substitution) of the cellulose ester. For example, acetone is a good solvent for an acetic ester of a cellulose ester of which the acetification degree is 2.4, as well as for an acetatepropionate of a cellulose ester, however, it is a poor solvent for an acetic ester of a cellulose of which the acetification degree is 2.8.

Good solvents used in the present invention include, for example: organic halides (such as methylene chloride), dioxolanes, acetone, methyl acetate and methyl acetoacetate, of which methylene chloride and methyl acetate are specifically preferable. However, the present invention is not specifically limited thereto.

Poor solvents used in the present invention include, for example: methanol, ethanol, n-butanol, cyclohexane and cyclohexanone, however, the present invention is not specifically limited thereto. A dope may preferably contain from 0.01 to 0.2 percent by weight of water.

In the step of preparing a dope, a cellulose ester is dissolved in a mixture of solvents using a common method. Dissolving a cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure. The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high. The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter. The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon®) as well as metal(alloy) filters (such as stainless steel) are preferable, since these materials are free from peeling of a fiber, which may occur when fibrous material is used. Impurities and, particularly, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicol state, illuminated with a light from one side and observed from the other. The number of luminescent foreign materials of larger than 0.01 mm in diameter is preferably less than 200 per $cm^2$, more preferably less than 100 per $cm^2$ and still more preferably from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

Flow-casting of a dope will be explained below:

A metal support polished to a mirror finished surface is used in the flow-casting step. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support is preferably from 0 to 40° C. and more preferably from 5 to 30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, the air temperature should be higher than the desired temperature of the support.

In order to obtain a cellulose ester film with a sufficient flatness, the content of residual solvent in the web when it is peeled from a metal support is preferably from 10 to 150 percent by weight, more preferably from 20 to 40 or from 60 to 130 percent by weight, and specifically more preferably from 20 to 30 or from 70 to 120 percent by weight.

The residual solvent content of the web is defined by the following formula:

$$\text{Residual solvent content (\% by weight)} = \{(M-N)/N\} \times 100$$

Where M represents weight of a sample of the web collected in the manufacturing step or after manufacturing, and N represents weight of the same sample after it was dried at 115° C. for 1 hour.

In the drying step of a cellulose ester film, the film is peeled from a support and further dried. The content of residual solvent in the resulting film is preferably less than 1 percent, more preferably less than 0.1 percent and specifically preferably from 0 to 0.01 percent.

In a drying process of a film, two methods may be employed, i.e., a roll drying method in which a cellulose ester film is passed through many rollers placed alternatively up and down in a staggered manner, and a tenter method in which a cellulose ester film is transported while both sides of the film are clipped to put tension in the lateral direction.

It is specifically preferable that a cellulose ester film is peeled from a metal support and is immediately stretched in the transport (longitudinal) direction while the film still contains much residual solvent. The film is then preferably stretched in the lateral direction using an above described tenter method. The stretching magnifications in both the longitudinal and the lateral directions are preferably in the range from 1.05 to 1.3 and more preferably from 1.05 to 1.15. The area of the film is preferably from 1.12 to 1.44 times larger and more preferably from 1.15 to 1.32 times larger, after the film is stretched in both the longitudinal and the lateral directions. The magnification of the stretched film area is a product of the stretch magnifications in both the longitudinal and the lateral directions. When one of the two stretching magnifications is lower than 1.05, the flatness of the film may be reduced by the irradiation of the UV rays in the hard coat layer forming step. A stretching magnification of higher than 1.3 is also unfavorable because of a greater loss in flatness and an increase in haze of the film.

A film is preferably peeled from the support with a tension of larger than 210 N/m and more preferably with a tension from 220 to 300 N/m in order to stretch the film in the longitudinal direction just after peeling.

The method to dry the web is not specifically limited, however, generally, hot air, IR ray, heated rollers or microwave irradiation is used. Hot air is preferably used with respect to ease of cure and low cost.

The preferable drying temperature of a web to obtain stable film dimensions is from 40 to 200° C. and more preferably from 50 to 140° C. The temperature is preferably increased stepwise.

The thickness of a cellulose ester is not specifically limited, however, a thickness from 10 to 200 μm is preferable. So far, a cellulose ester film of a thickness from 10 to 70 μm having a superior flatness as well as a sufficient hardness have been difficult to obtain, however, in the present invention, such films can be obtained at considerably high productivity. Hence, a preferable film thickness is from 10 to 70 μm, more preferably from 20 to 60 μm and most preferably from 35 to 60 μm.

The cellulose ester film used in the present invention has a width of 1 m through 4 m. When productivity and handling ease are taken into account, the particularly preferred width is 1.4 m through 2 m. If it exceeds 4 m, Conveyance for it may become difficult.

<Physical Properties>

The moisture permeability of the cellulose ester film of the present invention is 10 $g/m^2$ through 1200 $g/m^2$ per 24 hours, preferably 20 $g/m^2$ through 1000 $g/m^2$ per 24 hours, more preferably 20 $g/m^2$ through 850 $g/m^2$ per 24 hours at a temperature of 40° C. with a relative humidity of 90% RH. The moisture permeability can be measured according to the test procedure described in the JIS Z 0208.

The cellulose ester film of the present invention The elongation at break is preferably 10% through 80% according to the following measurement procedure, more preferably 20% through 50%.

The transmittance of the visible light obtained by the following method for measuring the cellulose ester film of the present invention is preferably 90% or more, more preferably 93% or more.

The haze of the cellulose ester film of the present invention measured by the following method is preferably less than 1%, more preferably 0 through 0.1%.

The in-plane retardation value Ro of the transparent support A of the present invention is preferably 0 through 70 nm, more preferably 0 through 30 nm, still more preferably 0 through 10 nm. The retardation value Rt along the film thickness is preferred not to exceed 400 nm. The retardation value Rt is more preferably −50 through 200 nm, still more preferably −5 through 100 nm.

The retardation values Ro and Rt can be calculated from the aforementioned Formulae (I) and (II).

The retardation values Ro and Rt can be measured by an automatic double refractometer. For example, a double refractometer KOBRA-21ADH (by Oji Scientific Instruments) can be used for this measurement in an environment of 23 degrees Celsius and 55% RH at a wavelength of 590 nm.

The slow phase axis is preferably within ±1 degree across the width of the film or ±1 degree along the length.

The cellulose ester film (a) having been produced is coated with an actinic radiation curable resin and antireflection layer to be described later, and can be used as an antireflection film.

The following describes the transparent support B of the present invention.

The transparent support B of the present invention is a stretched cellulose ester film (b) wherein the retardation value Ro defined by the following Formula (I) is 0 through 10 nm, and the retardation value Rt defined by the following Formula (II) is −30 through 20 nm.

The effects of the present invention are preferably improved when the retardation value Ro defined by the following Formula (I) is 0 through 5 nm, and the retardation value Rt defined by the following Formula (II) is −10 through 10 nm.

<Polymer>

The cellulose ester film (b) of the present invention preferably contains the polymer exhibiting negative double refraction in the direction of drawing in order to satisfy both the aforementioned retardation values Ro and Rt simultaneously. Although there is no particular restriction on this polymer, it preferably contains the polymer having a weight average molecular weight of 500 or more without exceeding 30000, obtained by polymerization of the ethylenic unsaturated monomer, for example.

The cellulose ester film (b) of the present invention preferably contains the acryl polymer exhibiting the negative double refraction in the direction of drawing, having a weight average molecular weight of 500 or more without exceeding 30000. This acryl polymer is preferably an acryl polymer including an aromatic ring on the side chain or an acryl polymer including a cyclohexyl group on the side chain.

The compatibility between the cellulose ester and this polymer can be improved when the composition of the polymer is controlled by the one having a weight average molecular weight of 500 or more without exceeding 30000. Especially when the acryl polymer, the acryl polymer including an aromatic ring on the side chain or an acryl polymer including a cyclohexyl group on the side chain preferably has a weight average molecular weight of 500 through 10000, it is possible to provide excellent transparency of the cellulose ester film subsequent to film formation, reduced moisture permeability and other superb performances as a polarizing plate protective film, in addition to the aforementioned advantage.

Since this polymer has a weight average molecular weight of 500 or more without exceeding 30000, it is estimated to be located somewhere between the oligomer and low-molecular polymer. When producing such a polymer, the molecular weight cannot be easily controlled by the conventional polymerization. In this case, it is preferred to use a method capable of ensuring the uniform molecular weight without much increasing the molecular weight. Such a preferred polymerization method is exemplified by: a method of using the peroxide polymerization initiator such as cumene peroxide and t-butylhydroperoxide; a method of using a greater amount of polymerization initiator than in the conventional way; a method of using a chain transfer agent such as a mercapto compound and carbon tetrachloride in addition to the polymerization initiator; a method of using a polymerization terminator such as benzoquinone and dinitrobenzene in addition to the polymerization initiator; and a method for bulk polymerization based on a compound including one thiol group and secondary hydroxyl group or a polymerization catalyst using this compound and organic metal compound as disclosed in the Japanese Non-Examined Patent Publication 2000-128911 or 2000-344823. These methods are all preferably used. The method according to the aforementioned Japanese Non-Examined Patent Publication is used in particular preference.

The following lists up the monomers as monomer units constituting the polymer advantageous to the present invention, without the present invention being restricted thereto:

Ethylenic unsaturated monomer units constituting the polymer obtained by polymerization of the ethylenic unsaturated monomer are:

a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, vinyl benzoate and vinyl cinnamate;

an acrylic acid ester such as methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), cyclohexyl acrylate, (2-ethylhexyl) acrylate, benzyl acrylate, phenetyl acrylate, (ε-caprolactone) acrylate, (2-hydroxy ethyl) acrylate, (2-hydroxy propyl) acrylate, (3-hydroxy propyl) acrylate, (4-hydroxy butyl) acrylate, (2-hydroxy butyl) acrylate, -p-hydroxy methylphenyl acrylate, and -p-(2-hydroxy ethyl) phenyl acrylate;

a methacrylic acid ester such as the one with the aforementioned acrylate replaced by methacrylate; and an unsaturated acid such as acrylic acid, methacrylic acid, maleic anhydride, crotonic acid and itaconic acid.

The polymer made of the aforementioned monomers can be either copolymer or homopolymer. The preferably used polymer is a vinyl ester homopolymer, a vinyl ester copolymer or a copolymer between vinyl ester and acrylic acid or methacrylic acid ester.

In the present invention, the acryl polymer is defined as an acrylic acid or methacrylic acidalkyl ester homopolymer or copolymer without monomer unit containing an aromatic ring or cyclohexyl group. The acryl polymer having an aromatic ring on the side chain refers to the acryl polymer containing the acrylic acid or methacrylic acid ester monomer unit provided with aromatic ring. The acryl polymer having a cyclohexyl group on the side chain refers to the acryl polymer containing the acrylic acid or methacrylic acid ester monomer unit equipped with cyclohexyl group.

The acrylic acid ester monomer without aromatic ring or cyclohexyl group is exemplified by methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), (2-ethylhexyl) acrylate, (ε-caprolactone) acrylate, (2-hydroxy ethyl) acrylate, (2-hydroxy propyl) acrylate, (3-hydroxy propyl) acrylate, (4-hydroxy butyl) acrylate, (2-hydroxy butyl) acrylate, (2-methoxy ethyl) acrylate, and (2-ethoxy ethyl) acrylate, or these substances with the acrylate thereof replaced by methacrylate.

The acryl polymer is a homopolymer or copolymer of the aforementioned monomer. It preferably contains 30% by mass or more of the acrylic acid methyl ester monomer unit, and 40% by mass or more of the methacrylic acid methyl ester monomer unit. The homopolymer of methyl acrylate or methyl methacrylate is particularly preferred.

The acrylic acid or methacrylic acid ester monomer containing the aromatic ring is exemplified by phenyl acrylate, phenyl methacrylate, (2- or 4-chlorophenyl) acrylate, (2- or 4-chlorophenyl) methacrylate, (2-, 3- or 4-ethoxycarbonylphenyl) acrylate, (2-, 3- or 4-ethoxycarbonylphenyl) methacrylate, (o-, m- or p-tolyl) acrylate, (o-, m- or p-tolyl) methacrylate, benzyl acrylate, benzyl methacrylate, phenethyl acrylate, phenethyl methacrylate, and (2-naphthyl) acrylate. Benzyl acrylate, benzyl methacrylate, phenethyl acrylate, and phenethyl methacrylate can preferably be used.

The acryl polymer having aromatic ring on the side chain preferably contains 20 through 40% by mass of the acrylic acid or methacrylic acid ester monomer unit having the aromatic ring, and 50 through 80% by mass of acrylic acid or methacrylic acid methyl ester monomer unit. The aforementioned polymer preferably contains 2 through 20% by mass of acrylic acid or methacrylic acid ester monomer unit containing the hydroxyl group.

The acrylic acid ester monomer containing the cyclohexyl group is exemplified by cyclohexyl acrylate, cyclohexyl methacrylate, (4-methyl cyclohexyl) acrylate, (4-methyl cyclohexyl) methacrylate, (4-ethyl cyclohexyl) acrylate, and (4-ethyl cyclohexyl) methacrylate. The acrylic acid cyclohexyl and methacrylic acid cyclohexyl can preferably be employed.

The acryl polymer having a cyclohexyl group on the side chain preferably includes 20 through 40%, and 50 through 80% by mass of acrylic acid or methacrylic acid ester monomer unit containing a cyclohexyl group. The aforementioned polymer preferably includes 2 through 20% by mass of the acrylic acid or methacrylic acid ester monomer unit containing the hydroxyl group.

The polymer and acryl polymer obtained by polymerization of the aforementioned ethylenic unsaturated monomer; acryl polymer having the aromatic ring on the side chain; and acryl polymer having the cyclohexyl group on the side chain all provide excellent compatibility with the cellulose resin.

The acrylic acid or methacrylic acid ester monomer having the aforementioned hydroxyl group is based on the structural unit of a copolymer, not homopolymer. In this case, acrylic acid or methacrylic acid ester monomer unit including the hydroxyl group preferably accounts for 2 through 20% by mass in the acryl polymer.

In the present invention, the polymer including a hydroxyl group on the side chain can be preferably utilized. Similarly to the case of the aforementioned monomer, acrylic acid or methacrylic acid ester is preferably used as the monomer unit having a hydroxyl group, and is exemplified by (2-hydroxy ethyl) acrylate, (2-hydroxy propyl) acrylate, (3-hydroxy propyl) acrylate, (4-hydroxy butyl) acrylate, (2-hydroxy butyl) acrylate, p-hydroxy methylphenyl acrylate, p-(2-hydroxy ethyl) phenyl acrylate, or the same wherein the aforementioned acrylic acid is replaced by the methacrylic acid. Use of the acrylic acid-2-hydroxy ethyl acrylate, and 2-hydroxy ethyl methacrylate is preferred. Preferably 2 through 20% by mass, more preferably 2 through 10% by mass of the acrylic acid ester or methacrylic acid ester monomer unit having a hydroxyl group in the polymer is included in the polymer.

It goes without saying that the aforementioned polymer including 2 through 20% by mass of monomer unit containing the aforementioned hydroxyl group provides excellent miscibility with the cellulose ester, outstanding retentivity and dimensional stability, minimized moisture permeability, and prominent dimensional stability, superb adhesiveness with polarizer as a polarizing plate protective film and improved durability of the polarizing plate.

There is no restriction to the method for allowing at least one of the terminals of the principal chain of the acryl polymer to have a hydroxyl group, if such a method ensures a hydroxyl group to be provided on the terminal of the principle chain in particular. Such a method is exemplified by: the method of using such a radical polymerization initiator including a hydroxyl group as azobis (2-hydroxy ethylbutylate); the method of using such a chain transfer agent having a hydroxyl group as 2-mercaptoethanol; the method of using a polymerization terminator having a hydroxyl group; the method of ensuring the hydroxyl group to be provided on the terminal by living ion polymerization; and the method of bulk polymerization based on polymerization catalyst through the use of a compound containing one thiol group and secondary hydroxyl group or through the combined use of this compound and organic metal compound, as disclosed in the Japanese Non-Examined Patent Publication 2000-128911 or 2000-344823. Use of the method disclosed in the Japanese Non-Examined Patent Publication is preferred in particular.

The polymer manufactured by the method disclosed therein is available on the market under the trade name of Actflow Series manufactured by Soken Kagaku Co., Ltd. This is preferably used. The polymer having a hydroxyl group on the aforementioned terminal and/or the polymer having a hydroxyl group on the side chain provides a substantial improvement of the compatibility and transparency of the polymer.

A polymer using styrene is preferably used as the ethylenic unsaturated monomer exhibiting negative double refractivity in the direction of drawing because it is more effective for manifestation of negative refractivity. Such styrene is exemplified by styrene, methyl styrene, dimethyl styrene, trimethyl styrene, ethyl styrene, isopropyl styrene, chloromethyl styrene, methoxy styrene, acetoxystyrene, chlorostyrene, dichloro styrene, bromostyrene, and vinyl methyl benzoate ester, without being restricted thereto. Polymerization can be made with the monomers mentioned as the aforementioned unsaturated ethylenic monomers, or two or more aforementioned polymers can be used to achieve compatibility with the cellulose resin for the purpose of controlling the double refraction.

Further, a cellulose ester film according to the present invention preferably contains:

the polymer X having a weight average molecular weight of 2000 or more without exceeding 30000, the aforementioned polymer X having been obtained by copolymerization between the ethylenic unsaturated monomer Xa without containing an aromatic ring and a hydrophilic group in the molecule, and the ethylenic unsaturated monomer Xb containing the hydrophilic group without an aromatic ring in the molecule; and the polymer Y having a weight average molecular weight of 500 or more without exceeding 3000, the aforementioned polymer Y having been obtained by polymerization of ethylenic unsaturated monomer Ya without aromatic ring.

<Polymer X and Polymer Y>

Various methods are known and anyone can also be adopted as a way of adjusting Ro and Rth of the present invention. However, from a point of transparency, it is desirable that a cellulose ester film contains a polymer X having an average molecular weight of 5000 to 30000 and obtained by copolymerization of an ethylenic unsaturated monomer Xa not having an aromatic ring and a hydrophilic group in a molecule thereof and an ethylenic unsaturated monomer Xb having a hydrophilic group and not having an aromatic ring in a molecule thereof, preferably contains a polymer Y having an average molecular weight of 500 to 3000 and obtained by polymerization of an ethylenic unsaturated monomer Ya not having an aromatic ring.

Generally, among monomers, it is well know that a substance which has an aromatic ring especially in a main chain has a positive birefringence property like a birefringence property of a cellulose ester. And it is desirable to add a material having a negative birefringence property in a film, because it does not negate a retardation value Rth of a cellulose ester film.

A polymer X used in the present invention is a polymer having a weight average molecular weight of 5000 or more without exceeding 30000, obtained by copolymerization between an ethylenic unsaturated monomer Xa without containing aromatic ring and hydrophilic group in its molecule and an ethylenic unsaturated monomer Xb containing a hydrophilic group without an aromatic ring in its molecule.

Preferably, Xa is an acryl monomer or a methacryl monomer each not having an aromatic ring and a hydrophilic group in a molecule thereof and Xb is an acryl monomer or a methacryl monomer each having a hydrophilic group and not having an aromatic ring in a molecule thereof.

A polymer X used in the present invention is preferably expressed by the following General Formula (1):

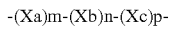    General Formula (1):

More preferably, it is a polymer expressed by the following General Formula (1-1):

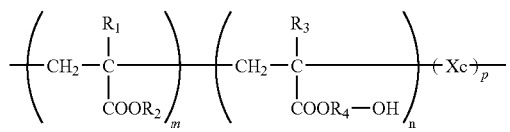

(where $R_1$ and $R_3$ in the Formula represent H or $CH_3$, $R_2$ represents an alkyl group or a cycloalkyl each having carbon atoms of 1-12, and $R_4$ denote $-CH_2-$ or $-C_2H_4-$ or $-C_3H_6-$. Xc represents a monomer unit polymerizable with Xa and Xb, and m n and p indicate a mole composition ratio. Here, m≠0, n≠0, and m+n+p=100)

The following lists up monomers as a monomer unit constituting the polymer X in the present invention without being restricted thereto. In X, a hydrophilic group means a hydroxyl group and a group which has an ethylene oxide chain.

The ethylenic unsaturated monomer Xa without containing either aromatic ring or hydrophilic group in a molecule is exemplified by methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), (2-ethylhexyl) acrylate, (ε-caprolactone) acrylate, (2-hydroxy ethyl) acrylate, and (2-ethoxy ethyl) acrylate. Among them, methyl acrylate, ethyl acrylate, methyl methacrylate, ethyl methacrylate or propyl methacrylate (i-, n-) is preferably used.

The ethylenic unsaturated monomer Xb containing the hydrophilic group without an aromatic ring in the molecule is preferably an acrylic acid or methacrylic acid ester as a monomer unit having a hydroxyl group. The preferred one is exemplified by (2-hydroxy ethyl) acrylate, (2-hydroxy propyl) acrylate, (3-hydroxy propyl) acrylate, (4-hydroxy butyl) acrylate, and (2-hydroxy butyl) acrylate, or these substances with the acrylate thereof replaced by methacrylate. Of these, (2-hydroxy ethyl) acrylate, (2-hydroxy ethyl) methacrylate, (2-hydroxy propyl) acrylate, and (3-hydroxy propyl) acrylate are more preferably used.

If a monmer as Xc is a copolymerizable ethylenic unsaturated monomer other than Xa and Xb, the monomer is not limited, however, it is desirable that the monomer has not an acromatic ring.

The mole composition ratio m:n of Xa and Xb is preferably in the range of 99:1 to 65:35, more preferably in the range of 95:5 to 75:25. The mole composition ratio "p" of Xc is 0 to 10. Xc may be a plurality of monomer units.

If the mole composition ratio Xa is greater, compatibility with the cellulose ester will be improved but retardation value Rt along the film thickness will be increased. Further, the mole composition ratio of Xb exceeds the above range, haze may be caused at the time of film production. It may desirable to optimize these and determining the mole composition ratio of Xa and xb.

The polymer X preferably has a weight average molecular weight of 5000 or more without exceeding 30000, more preferably a weight average molecular weight of 8000 or more without exceeding 25000.

If the molecular weight is greater than 5000, there are such advantages as smaller dimensional variation of the cellulose ester film at a high temperature and humidity and smaller curl as a polarizing plate protective film. When the weight average molecular weight does not exceeds 30000, compatibility with cellulose ester will be improved, refraining a problem as bleed-out at a high temperature and high humidity or an optical haze immediately after formation of the film.

The weight average molecular weight of polymer X in the present invention can be adjusted by the known method for molecular weight adjustment. Such a method for molecular weight adjustment can be exemplified by the method of adding a chain transfer agent such as carbon tetrachloride, laurylmercaptan, and octyl thioglycolate. The polymerization temperature is kept within the range from room temperature through 130 degrees Celsius, preferably from 50 through 100 degrees Celsius. This temperature or polymerization reaction time can be adjusted.

The weight average molecular weight can be measured according to the following method:

(Method of Measuring the Molecular Weight)

The weight average molecular weight Mw is measured by gel permeation chromatography.

The following describes the measurement conditions:
Solvent: methylene chloride
Column: Shodex K806, K805 and K803G (Three pieces manufactured by Showa Denko K.K. were connected for use)
Column temperature: 25 degrees Celsius
Sample concentration: 0.1% by mass
Detector: RI Model 504 (manufactured by GL Science Co., Ltd.)
Pump: L6000 (manufactured by Hitachi Limited)
Flow rate: 1.0 ml/min.
Calibration curve: The calibration curve using 13 samples of the standard polystyrene STK standard polystyrene (manufactured by Toso Co., Ltd.) was employed, wherein Mw=1000000 through 500. These 13 samples were placed at an approximately equally spaced interval.

The polymer Y used in the present invention is a polymer having a weight average molecular weight of 500 or more without exceeding 3000, being produced by polymerization of ethylenic unsaturated monomer Ya without aromatic ring. If the polymer has a weight average molecular weight of 500 or more, it is desirable, because the amount of the remaining monomer will be reduced. If the weight average molecular weight is 3000 or less, it is desirable, because the performance for reducing the level of retardation Rt can be maintained. Ya is preferably an acryl monomer or a methacryl monomer each not having an aromatic ring.

A polymer Y used in the present invention is preferably expressed by the following General Formula (2):

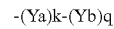    General Formula (2):

More preferably, it is preferably a polymer expressed by the following General Formula (2-1):

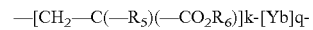

(where $R_5$ in the Formula represents H or $CH_3$, $R_6$ represents an alkyl group or a cycloalkyl each having carbon atomses of 1-12, and Yb represents a monomer unit polymerizable with Ya, and k and q indicate a mole composition ratio. Here, k≠0, and k+q=100)

If a monomer as Yb is a copolymerizable ethylenic unsaturated monomer with Ya, the monomer is not limited. Yb may be plural. k+q=100, q is preferably 0 to 30.

The ethylenic unsaturated monomer Ya constituting the polymer Y obtained by polymerization of the ethylenic unsaturated monomer without containing an aromatic ring is exemplified by:

an acrylic acid ester such as methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), cyclohexyl acrylate, (2-ethylhexyl) acrylate, (ε-caprolactone) acrylate, (2-hydroxyethyl) acrylate, (2-hydroxypropyl) acrylate, (3-hydroxypropyl) acrylate, (4-hydroxybutyl) acrylate, (2-hydroxybutyl) acrylate;

a methacrylic acid ester such as the one with the aforementioned acrylate replaced by methacrylate; and an unsaturated acid such as acrylic acid, methacrylic acid, maleic anhydride, crotonic acid and itaconic acid.

A monomer as Yb is not specifically limited, if the monomer is an ethylenic unsaturated monomer copolymerizable with Ya. The monomer as Yb is exemplified by:

a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, and vinyl cinnamate. Yb may be plural.

When producing such a polymer X and Y, the molecular weight cannot be easily controlled by the conventional polymerization. In this case, it is preferred to use a method capable of ensuring the uniform molecular weight without much increasing the molecular weight. Such a preferred polymerization method is exemplified by: a method of using the peroxide polymerization initiator such as cumene peroxide and t-butyl hydroperoxide; a method of using a greater amount of polymerization initiator than in the conventional way; a method of using a chain transfer agent such as a mercapto compound and carbon tetrachloride in addition to the polymerization initiator; a method of using a polymerization terminator such as benzoquinone and dinitrobenzene in addition to the polymerization initiator; and a method for bulk polymerization based on a compound including one thiol group and secondary hydroxyl group or a polymerization catalyst using this compound and organic metal compound as disclosed in the Japanese Non-Examined Patent Publication 2000-128911 or 2000-344823. These methods are all preferably used. Especially, for the polymer Y, a polymerization method which uses a compound having a thiol group and a hydroxyl group of a 2nd class in a molecule as a chain transfer agent, is desirable. In this case, at a terminal end of the polymer Y, it has a hydroxyl group resulting from a polymerization catalyst and a chain transfer agent and thioether. With this terminal residue group, the compatibility of Y and cellulose ester can be adjusted.

The hydroxyl group value of the polymer X is preferably 30 through 150 [mg KOH/g].

(Method of Measuring the Hydroxyl Group Value)

The hydroxyl group value was measured according to the JIS K 0070(1992). The hydroxyl group value can be defined as the value in terms of mg of the potassium hydroxide required to neutralize the acetic acid bonded with the hydroxyl group, when 1 g of the sample is acetylated. To put it more specifically, the following steps were taken: weighing X g (about 1 g) of sample accurately; putting it into a flask; adding 20 ml of acetylation reagent (pyridine added to 20 ml of acetic anhydride to get 400 ml) accurately thereto; providing the outlet of the flask with an air cooling tube; healing the solution in a glycerine bath having a temperature of 95 through 100 degrees Celsius; cooling the solution after the lapse of one hour and 30 minutes; and adding 1 ml of purified water 1 ml through the air cooling tube so that the acetic anhydride was decomposed into acetic acid. This was followed by the step of titration by a potential difference titration apparatus using a 0.5 mol/L potassium hydroxide ethanol solution. The inflection point of the titration curve having been obtained was defined as a terminal point. Then titration was carried out in an idle test wherein a sample was not put therein. Thus, the inflection point of the titration curve was obtained, and the hydroxyl group value was calculated according to the following Equation.

Hydroxyl group value={(B−C)×f×28.05/X}+D where B denotes the amount (ml) of 0.5 mol/L potassium hydroxide ethanol solution used in the idle test, C indicates the amount (ml) of 0.5 mol/L potassium hydroxide ethanol solution used in the titration, f shows the factor of 0.5 mol/L potassium hydroxide ethanol solution, D represents an acid value, and 28.05 is equivalent to a half of 56.11 as 1 mol potassium hydroxide.

The above-mentioned polymer X and polymer Y each excels in compatibility with a cellulose ester. Also these polymers have neither evaporation nor volatilization, these polymers are excellent in manufacturing efficiency, and their permanence properties as a protection film for polarizing plates are preferable, and their water vapour permiability is small, and thy are excellent in dimensional stability.

The contents of the polymers X and Y in the cellulose ester film preferably meet the following Formulae (i) and (ii): assuming that the content of the polymer X is Xg (% by mass=the mass of the polymer X/the mass of the cellulose ester×100), and that of the polymer Y is Yg (% by mass), $5 \leq Xg+Yg \leq 35$ (% by mass)  Formula (i):

$0.05 \leq Yg/(Xg+Yg) \leq 0.4$  Formula (ii):

where Formula (i) is preferably in the range from 10 through 25% by mass.

When the total amount of the polymers X and Y must be 5% by mass or more; a sufficient reduction in retardation value Rt can be achieved. Further, when the total amount is 35% by mass or less; the adhesiveness of the polarizer PVA will be excellent.

The polymers X and Y as materials constituting the aforementioned doping solution can be directly added and dissolved. Alternatively, they can be put into the doping solution after having been dissolved in the organic solvent for dissolving the cellulose ester. Film formation of the transparent support B using the doping solution obtained from this procedure can be performed in the same way as that for the aforementioned transparent support A. This provides the stretched cellulose ester film of the present invention.

The cellulose ester films as transparent supports A and B of the present invention are preferably used for the liquid crystal display member due to a high degree of moisture permeability and dimensional stability. The liquid crystal display member refers to the member used in the liquid crystal display apparatus, and is exemplified by a polarizing plate, polarizing plate protective film, phase difference plate, antireflection plate, film of improved angle of visibility, optical correction film, antiglare film, nonreflective film, antistatic film, antireflection film and light dispersion film. The cellulose ester film is preferably used in the polarizing plate, polarizing plate protective film, antireflection film among the aforementioned films. Especially when used on an ultimate surface of the liquid crystal display apparatus as a polarizing plate protective film, an antireflection layer is preferably provided on the surface of the film.

(Actinic Ray Cured Resin Layer)

In the present invention, it is desirable that an actinic ray cured resin layer is coated on a cellulose ester film. Especially, it is desirable that an actinic ray cured resin layer is coated on a transparent support A.

It is desirable that the actinic ray cured resin layer is a hard court layer. When a pencil hardness evaluation specified by JIS-K-5400 is conducted with a test pencil specified by JIS-S-6006, it is desirable that a pencil hardness is H-8H, and it is more desirable that it is 2H-4H.

Hereafter, a production method of an actinic ray cured resin layer used as a hard coat layer is explained.

An actinic ray cured resin layer is preferably used as a hard coat layer used for a cellulose ester film of the present invention.

An actinic ray cured resin layer refers to a layer mainly comprising a resin which can be cured through a cross-linking reaction caused by irradiating with actinic rays such as UV rays or electron beams. A composition containing ethylenically unsaturated monomers is preferably utilized to form a hard coat layer by hardening the composition with irradiating actinic rays such as UV rays or electron beams. Typical examples of actinic ray curable resins include a UV ray-curable resin and an electron beam curable resin, however, a UV ray-curable resin is more preferably utilized.

The UV curable resin includes, for example: a UV-curable acryl urethane type resin, a UV-curable polyester acrylate type resin, a UV-curable epoxy acrylate type resin, a UV-curable polyol acrylate type resin and a UV-curable epoxy type resin.

The UV-curable urethane acrylate type resin includes compounds which are generally prepared easily by, initially, reacting polyester polyol with a monomer or a prepolymer of isocyanate, followed by further reacting the product with an acrylate type monomer having a hydroxy group such as 2-hydroxyethyl acrylate, 2-hydroxyethyl methacrylate (hereinafter, only acrylates are described, however methacrylates are also included) and 2-hydroxypropyl acrylate. For example, a compound disclosed in JP-A 59-151110 is preferably used.

For example, a mixture of 100 weight parts of UNIDIC 17-806 (Dainippon Ink and Chemicals, Inc.) and 1 weight part of COLONATE L (Nippon Polyurethane Industry Co., Ltd.) is preferably used.

The UV-curable polyester acrylate type resins include compounds which are generally prepared easily by reacting a polyester polyol with a 2-hydroxyethyl acrylate type or a 2-hydroxy acrylate type monomer. For example, those disclosed in JP-A 59-151112 are preferably used.

The UV-curable epoxy acrylate type resin includes compounds which are prepared by reacting an epoxy acrylate oligomer with a reactive dilutant and a photoreaction initiator. For example, as disclosed in JP-A 1-105738 are preferably used.

The UV-curable polyol acrylate type resin includes, for example: trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

The photoreaction initiators include, for example: benzoine including derivatives, acetophenone, benzophenone, hydroxy benzophenone, Michler's ketone, α-amyloxim ester and thioxanthone including derivatives. These compounds may be utilized together with a photo sensitizer. The photoreaction initiator described above can also be utilized as a photo sensitizer. Further, sensitizers such as n-butyl amine, triethyl amine and tri-n-butyl phosphine can be utilized together with an epoxy acrylate type photoreaction agent. The amount of a photoreaction initiator or a photo sensitizer is preferably from 0.1 to 15 weight parts, more preferably from 1 to 10 weight parts in 100 weight parts of the UV-curable resins described above.

Resin monomers include, for example: (i) a monomer having one unsaturated double bond, such as methyl acrylate, ethyl acrylate, butyl acrylate, benzyl acrylate, cyclohexyl acrylate, vinyl acetate and styrene, and (ii) a monomer having two or more unsaturated double bonds, such as ethyleneglycol diacrylate, propyleneglycol diacrylate, divinyl benzene, 1,4-cyclohexyane diacrylate and 1,4-cyclohexyldimethyl diacrylate. Foregoing trimethylolpropane triacrylate and pentaerythritol tetraacrylate ester are also included.

Selected products available on the market as a UV curable resin which can be utilized in the present invention may be: Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-101 DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include, for example: trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

The UV curable resin layer can be applied by any method well known in the art, for example: a gravure coater, a dip coater, a reverse coater, a wire bar coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the type of lamp, however, it is generally from 5 to 150 mJ/cm$^2$, and is more preferably from 20 to 100 mJ/cm$^2$.

Irradiation with ionizing radiation onto the hard coat layer is preferably carried out while tension in the transportation direction is applied to the film, and more preferably it is carried out while tension in the lateral direction is also applied to the file. The tension to be applied is preferably 30-300 N/m. The method to apply the tension is not specifically limited. The tension may be applied to the film transportation direction on a backroll or may be applied to the lateral direction or to the biaxial directions by using a tenter, whereby a film having further improved flatness is obtained.

An organic solvent can be selected from, for example: the hydrocarbon series, the alcohol series (methanol, ethanol, isopropanol, butanol and cyclohexanol), the ketone series (acetone, methyl ethyl ketone and isobutyl ketone), the ester series (methyl acetate, ethyl acetate and methyl), the glycol ether series and other organic solvents. These organic solvents may be also used in combinations. The above mentioned organic preferably contains propyleneglycol monoalkylether (with an alkyl group having 1 to 4 carbon atoms) or propyleneglycol monoalkylether acetate ester (with an alkyl group having 1 to 4 carbon atoms) with a content of 5 percent by weight or more, and more preferably from 5 to 80 percent by weight.

In a coating solution of a UV ray-curable resin, a silicon compound such as a polyether modified silicone oil, is preferably added. The number average molecular weight of a polyether modified silicone oil is preferably from 1,000 to 100,000 and more preferably from 2,000 to 50,000. Addition of a polyether modified silicone oil with a number average molecular weight of less than 1,000 may lower the drying rate of the coating solution, while on the other hand, that of more than 100,000 may result in a difficulty in bleeding out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of the solution onto a substrate or an under coat layer. If these compounds are used as the top layer of stacked film layers, these compounds may contribute to improve not only water-resistance, oil-resistance and anti-staining properties, but also improve scratch resistance of the film. The content of the added silicon compound is preferably from 0.01 to 3 percent by weight based on the solid composition in the coating solution.

Aforementioned coating methods are preferably also used to coat a solution of UV ray-curable resin. The thickness of a wet film of coated UV-curable resin is preferably from 0.1 to 30 μm and more preferably from 0.5 to 15 μm. The thickness of the dried film of the same is preferably from 0.1 to 10 μm and more preferably from 1 to 10 μm.

A UV ray-curable resin layer is preferably irradiated with UV rays while the layer is being dried, or alternatively after it is dried. The duration of UV ray irradiation of the amount from 5 to 100 mJ/cm$^2$ as mentioned above is preferably from 0.1 seconds to 5 minuets. With respect to working efficiency and hardening efficiency of the UV-curable resin, the duration of the same is more preferably from 0.1 to 10 seconds.

The intensity of the actinic ray is preferably from 50 to 150 mW/m$^2$.

The UV-cured resin layer thus obtained may preferably contain inorganic or organic microparticles in order to attain the following characteristics: preventing blocking, improving scratch resistance, providing an antiglare property and optimizing the reflective index.

Inorganic particles to be contained in a hard coat layer include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic particles include, for example: microparticles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic particles include, for example: particles of cross-linked polystylene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The average particle diameter of these fine particle powder is preferably 0.005-5 μm and specifically preferably 0.01-1 μm. As for the rate of an ultraviolet-rays cured resin composition and fine particles powder, it is desirable to blend it to 100 mass parts of a resin composite so that it may become 0.1-30 mass parts.

It is desirable that an ultraviolet-rays cured resin layer is a clear hard coat layer having a center-line average roughness (Ra) of 1 to 50 nm or an anti-glare layer having Ra of 0.1 to 1 μm. The center-line average roughness (Ra) is measured preferably by means of a surface roughness meter using interference of light, for example, RST/PLUS manufactured by WYKO Co., Ltd.

A UV ray-curable resin layer having a convexo-concave surface is preferably formed by using an emboss roll with a convexo-concave surface, and also a UV ray-curable resin layer exhibiting anti-glare generated via formation of convexoconcave on the surface is preferably employed for a ink-jet method or a printing method.

(Back Coat Layer)

The hard coat film of the present invention having a hard coat layer on one-surface of the cellulose ester film is preferably provided with a back coat layer on the other surface of the cellulose ester film. A back coat film is provided on a cellulose ester film to prevent curling which may occur when a hard coat layer or other layers are formed on a cellulose ester film by means of a coating method or by CVD. Namely, by adding a counter force to curl toward the back coat side, the force to curl toward the hard coat layer side may be balanced out. Also, a back coat layer preferably has a feature to prevent blocking. For this purpose, microparticles are preferably added to a coating composition of back coat layer.

Microparticles preferably added to the back coat layer include inorganic microparticles, for example, silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Microparticles containing silicon are preferably used to minimize the haze. Of the above, silicon dioxide is specifically preferable.

Inorganic microparticle available on the market include, for example: AEROSIL R972, R927V, R974, R812, 200, 200V, 300, R202 and OX50 which are manufacture by Nippon Aerosil Co. Ltd. Microparticles of zirconium oxide available on the market include, for example: AEROSIL R976 and R811 manufacture by Nippon Aerosil Co. Ltd. Microparticles of polymer include, for example: silicone resin, fluorine-contained resin and acryl resin. Among these, silicone resin, especially three dimensionally networked silicone resin is preferably used. Examples of silicone resins available on the market include TOSPERL 103, 105, 108, 145, 3120 and 240, which are manufactured by Toshiba Silicone Co., Ltd.

Among the microparticles listed above, AEROSIL 200V and AEROSIL R972V are particularly preferable with respect to effectively preventing blocking while minimizing haze. The kinetic friction coefficient of the rear side of the hard coat layer in the present invention is preferably less than 0.9 and specifically preferably from 0.1 to 0.9.

The content of microparticles contained in the back coat layer is preferably from 0.1 to 50 percent by weight and more preferably from 0.1 to 10 percent by weight. The increase in haze after the hard coat film is provided with a back coat layer is preferably less than 1 percent, more preferably less than 0.5 percent and specifically preferably from 0.0 to 0.1 percent.

The back coat layer is formed by means of a coating method using a coating solution containing a solvent which dissolves and/or swells cellulose ester. The solvent may occasionally be comprised of a solvent which does not dissolve nor swell cellulose ester. The mixing ratio of these solvents and the amount of the coating solution to be used for forming a back coat layer is appropriately determined depending on the extent of the curl and the type of the resin used for the hard coat film.

In order to have a larger effect to prevent curl in the film, the mixing ratio of type A solvent is increased while the ratio of type B solvent is decreased. The mixing ratio of type A solvent to type B solvent is preferably 10 to 0 through 1 to 9. Examples of type A solvent include: dioxane, acetone, methyl ethyl ketone, N,N-dimethyl formamide, methyl acetate, ethyl acetate, trichloroethylene, methylene chloride, ethylene chloride, tetrachloroethane, trichloroethane and chloroform. Examples of type B solvent include: methanol, ethanol, n-propyl alcohol, i-propyl alcohol, n-butanol and hydrocarbons (such as toluene, xylene and cyclohexane).

The back coat layer is coated by means of, for example: a gravure coater, a dip coater, a reverse coater, a wire-bar coater and a die coater, in a thickness of preferably from 1 to 100 μm and specifically preferably from 5 to 30 μm. Resins utilized as a binder in a back coat layer include, for example: (i) vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, an ethylene/vinyl alcohol copolymer, a chlorinated polyvinylchloride, an ethylene/vinyl chloride copolymer and a ethylene/vinyl acetate copolymer; (ii) cellulose ester type resins such as cellulose nitrate, cellulose acetate propionate, cellulose diacetate, cellulose triacetate, cellulose acetate phthalate and cellulose acetate butylate; (iii) rubber type resins such as a copolymer of maleic acid and/or acrylic acid, a copolymer of acrylate ester, an acrylonitrile/stylene copolymer, a chlorinated polyethylene, an acrylonitrile/chlorinated polyethylene/stylene copolymer, a methylmethacrylate/butadiene/stylene copolymer, an acryl resin, a polyvinylacetal resin, a polyvinylbutyral resin, a polyester polyuretane resin, a polyether polyurethane resin, a polycarbonate polyurethane resin, a polyester resin, a polyether resin, a polyamide resin, an amino resin, a stylene/butadiene resin and a butadiene/acrilonitrile resin; (iv) a silicone type resin; and (v) a fluorine-containing type resin, however, the present invention is not limited thereto. Examples of acryl resins available on the market include homopolymers and copolymers produced from acryl or methacryl monomers, such as: Acrypet MD, VH, MF and V (manufactured by Mitsubisi Rayon Co., Ltd.), Hi Pearl M-4003, M-4005, M-4006, M-4202, M-5000, M-5001 and M-4501 (Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (manufactured by Mitsubisi Rayon Co., Ltd.). A resin used in the present invention may suitably be selected from the above examples.

Cellulose type resin such as diacetyl cellulose and cellulose acetate propionate is specifically preferable.

The coating order of a back coat layer on a cellulose ester film is not specifically limited, namely, a back coat layer may be formed before or after forming the layers on the opposite surface (hard coat layer and other layers such as antistatic layer), however, when a back coat layer also functions as an antiblocking layer, the back coat layer is preferably formed before the opposite side layers. Coating of a back coat layer may preferably be divided in two or more times. Incidentally, a backcourt layer mentioned here can be coated also on an optical compensation film, whereby the flatness of the optical compensation film can be maintained, and a retardation change can be lessen.

(Anti-Reflection Layer)

The anti-reflection layer via optical interference which is employed in the present invention will be described.

The anti-reflection layer may be a single-layer structured low refractive index layer or a multi-layer structured refractive index layer. The hard coat layer (clear hard coat layer or anti-glare layer) is provided on a transparent film support, and the anti-reflection layer can be laminated on the support surface so as to reduce reflectance because of optical interference in consideration of refractive index, thickness, the number of layers, and the order of layers. The anti-reflection layer possesses high refractive index layers having a higher refractive index than that of the support and a low refractive index layer having a lower refractive index than that of the support in combination, but an anti-reflection layer having at least 3 refractive index layers is particularly preferable. It is preferred that a medium refractive index layer (higher refractive index than that of a support or a hard coat layer and lower refractive index than that of a higher refractive index layer), a high refractive index layer and a low refractive index layer are laminated in this order for the three layers of different refractive indices from the support side. A hard coat layer may serve for a high refractive index layer.

Preferable examples of the layer structure in an antireflection film of the present invention are described below. Symbol "/" indicated below means "laminated" here.

back coat layer/support/hard coat layer/low refractive index layer back coat layer/support/hard coat layer/high refractive index layer/low refractive index layer back coat layer/support/hard coat layer/medium refractive index layer/high refractive index layer/low refractive index layer back coat layer/support/antistatic layer/hard coat layer/medium refractive index layer/high refractive index layer/low refractive index layer antistatic layer/support/hard coat layer/medium refractive index layer/high refractive index layer/low refractive index layer/back coat layer/support/hard coat layer/high refractive index layer/low refractive index layer/high refractive index layer/low refractive index layer In order to easily remove stains or fingerprints, an anti-stain layer is preferably provided on the outermost low refractive index layer. A fluorine-containing organic compound is preferably used in the anti-stain layer.

(Low refractive index layer) The following hollow silica particles are preferably employed for a low refractive index layer of the present invention.

(Hollow Silica Particles)

Hollow particles are (I) complex particles constituted of a porous particle and a cover layer arranged on the surface of said porous particle or (II) hollow particles, the interior of which is hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the interior of which is hollow, and the hollow is surrounded by a particle wall. The interior of the hollow is filled with the contents such as a solvent, a gas or a porous substance which have been utilized in preparation. The mean particle diameter of such hollow particles is preferably in a range of 5-300 nm and preferably of 10-200 nm. The mean particle diameter of hollow particles utilized is appropriately selected depending on the thickness of the formed transparent cover film and is preferably in a range of 2/3-1/10 of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porousness of the interior, whereby an effect of a low refractive index may not be obtained. Further, when a thickness of the cover layer is over 20 nm, the aforesaid silicate monomer or oligomer never immerses into the interior, however, the porosity (a micro-pour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, NaF, $NaAlF_6$ and MgF. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$ and $WO_3$. In such a porous particle, mole ratio $MO_x/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased. Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those containing single component or mixture of plural components.

As a manufacturing method of such hollow particles, a preparation method of complex oxide colloidal particles, disclosed in paragraph Nos. [0010]-[0033] of Japanese Patent O.P.I. Publication No. 7-133105, is suitably applied.

The refractive index of the resulting hollow particle is low because of the hollow structure, and The refractive index of the resulting hollow particle in the present invention is preferably 1.30-1.50, and more preferably 1.35-1.44.

The content (by weight) of hollow silica particles having an outer layer as well as pores or cavities in a low refractive index layer coating solution is 10-80% by weight, and more preferably 20-60% by weight.

(Tetraalcoxy Silane Compound or Hydrolysate Thereof)

A tetraalcoxy silane compound or its hydrolysate as a sol-gel material is preferably contained in a low refractive index layer of the present invention.

As components for the low refractive index layer usable in the present invention, organic group-containing silicon oxides other than the foregoing inorganic silicon oxides are preferably usable. These are generally called sol-gel components. Preferably employed as such sol-gel components may be metal alcolates, and organoalkoxy metal compounds and hydrolysis products thereof. Particularly preferred are alkoxysilane, and hydrolysis products thereof. It is also preferable to use tetraalkoxysilane (tetramethoxysilane and tetraethoxysilane), alkyltrialkoxysilane (methyltrimethoxysilane, and ethyltrimethoxysilane), aryltrialkoxysilane (phenyltrimethoxysilane), dialkyldialkoxysilane, diaryldialkoxysilane, and the like.

It is preferred that the low refractive index layer employed in the present invention contains the foregoing silicon oxide and the following silane coupling agent.

Specific examples of silane coupling agents include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, and phenyltriacetoxysilane.

Further, examples of silane coupling agents having two alkyl substituents for silicon include dimethyldimethoxysilane, phenylmethyldimethoxysilane, dimethyldiethoxysilane, and phenylmethyldiethoxysilane.

Specific examples of silane coupling agents produced by Shin-Etsu Chemical Co., Ltd include KBM-303, KBM-403, KBM-402, KBM-1403, KBM-502, KBM-503, KBE-502, KBE-503, KBM-603, KBE-603, KBM-903, KBE-903, KBE-9103, KBM-802 or KBM-803.

It is preferred that the silane coupling agent is hydrolyzed with a predetermined amount of water in advance. When a silane coupling agent is hydrolyzed, the surface of the foregoing silicon oxide particle or the silicon oxide particle containing an organic group is easy to be reactive, resulting in formation of strengthened films. The silane coupling agent which has been hydrolyzed may also be added into a coating solution in advance.

It is also preferable that the low refractive index layer incorporates polymers in an amount of 5-50 percent by weight. The above polymers exhibit functions such that particles are subjected to adhesion and the structure of the above low refractive index layer is maintained. The used amount of the polymers is controlled so that without filing voids, it is possible to maintain the strength of the low refractive index layer. The amount of the polymers is preferably 10-30 percent by weight of the total weight of the low refractive index layer. In order to achieve adhesion of particles employing polymers, it is preferable that (1) polymers are combined with surface processing agents of particles, (2) a polymer shell is formed around a particle used as a core, or (3) polymers are employed as a binder among particles.

Binder polymers are preferably polymers having saturated hydrocarbon or polyether as a main chain, but is more preferably polymers having saturated hydrocarbon as a main chain. The above binder polymers are subjected to crosslinking. It is preferable that the polymers having saturated hydrocarbon as a main chain is prepared employing a polymerization reaction of ethylenic unsaturated monomers. In order to prepare crosslinked binder polymers, it is preferable to employ monomers having at least two ethylenic unsaturated groups. Listed as examples of monomers having at least two ethylenic unsaturated groups are esters of polyhydric alcohol with (meth)acrylic acid (for example, ethylene glycol di(meth)acrylate, 1,4-dicyclohexane diacrylate, pentaerythritol tetra(meth)acrylate, pentaerythritol (meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides.

The low refractive index layers usable in the present invention may be a low refractive index layer formed by crosslinking of fluorine containing resins (hereinafter referred to as "fluorine containing resins prior to crosslinking") which undergo crosslinking via heating or ionizing radiation.

Preferably listed as fluorine containing resins prior to coating are fluorine containing copolymers which are formed employing a fluorine containing vinyl monomer and a monomer which provides a crosslinking group. Listed as specific examples of the above fluorine containing vinyl monomer units include: fluoroolefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (for example, BISCOAT 6FM (produced by Osaka Organic Chemical Industry Ltd.) and M-2020 (produced by Daikin Industries, Ltd.), and completely or partially fluorinated vinyl ethers. Listed as monomers to provide a crosslinking group are vinyl monomers previously having a crosslinking functional group in the molecule, such as glycidyl methacrylate, vinyltrimethoxysilane, γ-methacryloyloxypropyltrimethoxysilane, or vinyl glycidyl ether, as well as vinyl monomers having a carboxyl group, a hydroxyl group, an amino group, or a sulfone group (for example, (meth)acrylic acid, methylol (meth)acrylate, hydroxyalkyl (meth)acrylate, allyl acrylate, hydroxyalkyl vinyl ether, and hydroxyalkyl allyl ether). Japanese Patent O.P.I. Publication Nos. 10-25388 and 10-147739 describe that a crosslinking structure is introduced into the latter by adding compounds having a group which reacts with the functional group in the polymer and at least one reacting group. Listed as examples of the crosslinking group are a acryloyl, methacryloyl, isocyanate, epoxy, aziridine, oxazoline, aldehyde, carbonyl, hydrazine, carboxyl, methylol or active methylene group. When fluorine containing polymers undergo thermal crosslinking due to the presence of a thermally reacting crosslinking group or the combinations of an ethylenic unsaturated group with thermal radical generating agents or an epoxy group with a heat generating agent, the above polymers are of a heat curable type. On the other hand, in cases in which crosslinking undergoes by exposure to radiation (preferably ultraviolet radiation and electron beams) employing combinations of an ethylenic unsaturated group with photo-radical generating agents or an epoxy group with photolytically acid generating agents, the polymers are of an ionizing radiation curable type.

The ratio of each monomer to form the fluorine containing copolymers prior to coating is as follows. The ratio of fluorine containing vinyl monomers is preferably 20-70 mol percent, but is more preferably 40-70 mol percent; the ratio of monomers to provide a crosslinking group is preferably 1-20 mol percent, but is more preferably 5-20 mol percent, and the ratio of the other monomers simultaneously employed is preferably 10-70 mol percent, but is more preferably 10-50 mol percent.

The low refractive index layer of the present invention can be formed via coating, employing a dip coat method, an air knife coat method, a curtain coat method, a roller coat method, a wire bar coat method, a gravure coat method, or an extrusion coat method (U.S. Pat. No. 2,681,294). Two or more layers may be applied simultaneously. The method of simultaneous application is described in, for example, U.S. Pat. Nos. 2,761,791, 2,941,898, 3,508,947, 3,526,528 and "Yuji Harasaki: Coating Engineering, p. 253 (1973), published by Asakura Publishing Co., Ltd."

The low refractive index layer of the present invention preferably has a thickness of 50-200 nm, and more preferably has a thickness of 60-150 nm.

(High Refractive Index Layer and Medium Refractive Index Layer)

In the present invention, a high refractive index layer is preferably arranged between a transparent support and a low refractive index layer. Further, to arrange a medium refractive index layer between a transparent substrate and a high refractive index layer is preferred to reduce the reflectance. A refractive index of a high refractive index layer is preferably 1.55-2.30 and more preferably 1.57-2.20. A refractive index of a medium refractive index layer is adjusted to be an intermediate value between a refractive index of a transparent support and a refractive index of a high refractive index layer. A refractive index of a medium refractive index layer is preferably 1.55-1.80. Thickness of a high refractive index layer and a medium refractive index layer is preferably 5 nm-1 μm, more preferably 10 nm-0.2 μm and most preferably 30 nm-0.1 μm. The haze of a high refractive index layer and a medium refractive index layer is preferably not more than 5%, more preferably not more than 3% and most preferably not more than 1%. The strength of a high refractive index layer and a medium refractive index layer is preferably not less than H based on pencil hardness at a loading weight of 1 kg, more preferably not less than 2H and most preferably not less than 3H.

It is preferable that the medium and high refractive index layers in the present invention are formed in such a manner that a coating solution containing a monomer or oligomer of an organic titanium compound represented by following Formula (1), or hydrolyzed products thereof are coated and subsequently dried, and the resulting refractive index is 1.55-2.5.

          Formula (1)

where $R_1$ is an aliphatic hydrocarbon group having 1-8 carbon atoms, but is preferably an aliphatic hydrocarbon group having 1-4 carbon atoms. Further, in monomers or oligomers of organic titanium compounds or hydrolyzed products thereof, the alkoxide group undergoes hydrolysis to form a crosslinking structure via reaction such as —Ti—O—Ti, whereby a cured layer is formed.

Listed as prefered examples of monomers and oligomers of organic titanium compounds employed in the present invention are dimers—decamers of $Ti(OCH_3)_4$, $Ti(OC_2H_5)_4$, $Ti(O-n-C_3H_7)_4$, $Ti(O-i-C_3H_7)_4$, $Ti(O-n-C_4H_9)_4$, and $Ti(O-n-C_3H_7)_4$, and dimers—decamers of $Ti(O-n-C_4H_9)_4$. These may be employed singly or in combination of at least two types. Of these, particularly preferred are dimers—decamers of $Ti(O-n-C_3H_7)_4$, $Ti(O-i-C_3H_7)_4$, $Ti(O-n-C_4H_9)_4$, and $Ti(O-n-C_3H_7)_4$.

The content of monomers and oligomers of organic titanium compounds employed in the present invention, as well as hydrolyzed products thereof is preferably 50.0-98.0% by weight with respect to solids incorporated in the liquid coating composition. The solid ratio is more preferably 50-90% by weight, but is still more preferably 55-90% by weight. Other than these, it is preferable to incorporate polymers of organic titanium compounds (which are subjected to hydrolysis followed by crosslinking) in a liquid coating composition, or to incorporate titanium oxide particles.

The high refractive index and medium refractive index layers in the present invention may incorporate metal oxide particles as particles and further may incorporate binder polymers.

In the above method of preparing a coating solution, when hydrolyzed/polymerized organic titanium compounds and metal oxide particles are combined, both strongly adhere to each other, whereby it is possible to obtain a strong coating layer provided with hardness and flexibility in evenly coated layer.

The refractive index of metal oxide particles employed in the high and medium refractive index layers is preferably 1.80-2.80, but is more preferably 1.90-2.80. The weight average diameter of the primary particle of metal oxide particles is preferably 1-150 nm, is more preferably 1-100 nm, but is most preferably 1-80 nm. The weight average diameter of metal oxide particles in the layer is preferably 1-200 nm, is more preferably 5-150 nm, is still more preferably 10-100 nm, but is most preferably 10-80 nm. Metal oxide particles at an average particle diameter of at least 20-30 nm are determined employing a light scattering method, while the particles at a diameter of at most 20-30 nm are determined employing electron microscope images. The specific surface area of metal oxide particles is preferably 10-400 $m^2/g$ as a value determined employing the BET method, is more preferably 20-200 $m^2/g$, but is most preferably 30-150 $m^2/g$.

Examples of metal oxide particles are metal oxides containing at least one element selected from the group consisting of Ti, Zr, Sn, Sb, Cu, Fe, Mn, Pb, Cd, As, Cr, Hg, Zn, Al, Mg, Si, P, and S. Specifically listed are titanium dioxide, (for example, rutile, rutile/anatase mixed crystals, anatase, and amorphous structures), tin oxide, indium oxide, zinc oxide, and zirconium oxide. Of these, titanium oxide, tin oxide, and indium oxide are particularly preferred. Metal oxide particles are composed of these metals as a main component of oxides and are capable of incorporating other metals. Main component, as described herein, refers to the component of which content (in percent by weight) is the maximum in the particle composing components. Listed as examples of other elements are Ti, Zr, Sn, Sb, Cu, Fe, Mn, Pb, Cd, As, Cr, Hg, Zn, Al, Mg, Si, P and S.

It is preferable that metal oxide particles are subjected to a surface treatment. It is possible to perform the surface treatment employing inorganic or organic compounds. Listed as examples of inorganic compounds used for the surface treatment are alumina, silica, zirconium oxide, and iron oxide. Of these, alumina and silica are preferred. Listed as examples of organic compounds used for the surface treatment are polyol, alkanolamine, stearic acid, silane coupling agents, and titanate coupling agents. Of these, silane coupling agents are most preferred.

A ratio of metal oxide particles in the high and medium refractive index layers is preferably 5-65% by volume, and more preferably 20-55% by volume.

The above-described metal oxide particles are supplied to a coating solution, which forms a high refractive index layer, in a state of dispersion being dispersed in a medium. As a dispersion medium of metal oxide particles, preferable is a liquid having a boiling point of 60-170° C. Specific examples of a dispersion medium include water, alcohol (such as methanol, ethanol, isopropanol, butanol and benzylalcohol), ketone (such as acetone, methyl ethyl ketone, methyl isobutyl ketone and cyclohexanone), ketone alcohol (such as diacetone alcohol), ester (such as methyl acetate, ethyl acetate, propyl acetate, butyl acetate, methyl formate, ethyl formate, propyl formate and butyl formate), aliphatic hydrocarbon (such as hexane and cyclohexane), hydrocarbon halogenide (such as methylene chloride, chloroform and carbon tetrachloride), aromatic hydrocarbon (such as benzene, toluene and xylene), amide (such as dimethylformamide, dimethylacetamide and n-methylpyrrolidone), ether (such as diethyl ether, dioxane and tetrahydrofuran) and ether alcohol (such as 1-methoxy-2-propanol). Among them, toluene, xylene, methyl ethyl ketone, methyl isobutyl ketone, cyclohexanone and butanol are specifically preferable.

Further, metal oxide particles can be dispersed in a medium by use of a homogenizer. Examples of a homogenizer include a sand grinder mill (for example, a beads mill equipped with a pin), a high speed impeller mill, a baffle mill, a roller mill, an atliter and a colloidal mill. A sand grinder mill and a high speed impeller mill are specifically preferable. Further, a preliminary dispersion may be performed. Examples of a homogenizer utilized in a preliminary dispersion include a ball mill, a three-roll mill, a kneader and an extruder.

In a high refractive index layer and a medium refractive index layer usable in the present invention, polymer having a cross-linked structure (hereinafter, also referred to as cross-linked polymer) is preferably utilized as binder polymer. Examples of cross-linked polymer include cross-linked compounds of polymer provided with a saturated hydrocarbon chain such as polyolefin (hereinafter, generally referred to as polyolefin), polyether, polyurea, polyurethane, polyester, polyamine, polyamide and melamine resin. Among them preferable are cross-linked compounds of polyolefin, polyether and polyurethane, more preferable are cross-linked compounds of polyolefin and polyether, and most preferably are cross-linked compounds of polyolefin.

In the present invention, examples of monomer having at least two ethylenic unsaturated group include ester of polyhydric alcohol and (meth)acrylic acid (such as ethyleneglycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate and polyester polyacrylate), vinylbenzene and derivatives thereof (such as 1,4-divinylbenzene, 4-vinylbenzoic acid-2-acryloyl ethylester, and 1,4-divinylcyclohexanone), vinyl sulfone (such as divinyl sulfone), acrylamide (such as methylene bisacrylamide) and methacrylamide. As monomer having an anionic group and monomer having an amino group or a quaternary ammonium group, monomer available on the market may be utilized. Monomer having an anionic group which is available on the market and preferably utilized includes Kayamar PM-21 and PM-2 (manufactured by Nippon Kayaku Co., Ltd.); Antox MS-60, MS-2N and MS-NH4 (manufactured by Nippon Nyukazai Co., Ltd.); Anilox M-5000, M-6000 and M-8000 series (manufactured by Toagosei Co., Ltd.); Viscoat #2000 series (manufactured by Osaka Organic Chemical Industry Ltd.); Newfrontier GX-8289 (manufactured by Dai-Ichi Kogyo Seiyaku Co., Ltd.); NK Ester CB-1 and A-SA (manufactured by Shin-Nakamura Chemical Co., Ltd.); and AR-100, MR-100 and MR-200 (manufactured by Dai-Hachi Chemical Industry Co., Ltd.). Further, monomer having an amino group or a quaternary ammonium group which is available on the market and preferably utilized includes DMAA (manufactured by Osaka Organic Chemical Industry Ltd.); DMAEA and DMAPAA (manufactured by Kohjin Co., Ltd.); Blemer QA (manufactured by Nippon Oil & Fat Co., Ltd.); and NewFrontier C-1615 (manufactured by Dai-Ichi Kogyo Seiyaku Co., Ltd.).

As a polymerization reaction of polymer, a photopolymerization reaction or a thermal polymerization reaction can be utilized and the former is specifically preferable. A polymerization initiator is preferably utilized. A polymerization initiator includes the above-described thermal polymerization initiator and photopolymerization initiator utilized to form binder polymer of a hard coat layer.

As a polymerization initiator, those available on the market may be utilized. A polymerization accelerator may be utilized in addition to a polymerization initiator. The addition amount of a polymerization initiator and a polymerization accelerator is preferably in the range of 0.2-10 weight % based on the total amount of monomer.

Added to each of the anti-reflection layers or the liquid coating compositions thereof may be polymerization inhibitors, leveling agents, thickeners, anti-coloring agents, UV absorbents, silane coupling agents, antistatic agents, and adhesion providing agents, other than the foregoing components such as metal oxide particles, polymers, dispersion media, polymerization initiators and polymerization accelerators.

In order to accelerate hydrolysis or curing of a composition containing metallic alkoxide, application of actinic radiation is preferable, after coating a medium or high refractive index layer in the present invention, or a low refractive index layer. Exposure to actinic radiation each time a layer is coated is more preferable.

There is no restriction to the type of the energy source for applying the actinic energy radiation used in the present invention, if it activates the compound by the ultraviolet ray, electron beam or gamma ray. The ultraviolet ray and electron beam are preferably used. The ultraviolet ray is particularly preferred since handling is easy and a high level of energy can be easily obtained. Any light source capable of generating the ultraviolet ray can be used as the light source of the ultraviolet ray for causing photo-polymerization of ultraviolet ray reactive compound. For example, it is possible to use the low voltage mercury lamp, intermediate voltage mercury lamp, high voltage mercury lamp, extra-high voltage mercury lamp, carbon arc light, metal halide lamp and xenon lamp. Further, the ArF excimer laser, KrF excimer laser, excimer lamp and synchrotron radiation can also be used. The conditions on irradiation differs according to each type. The preferred amount of irradiation is 20-10,000 mJ/cm$^2$. The more preferred amount is 100-2000 mJ/cm$^2$, and still more preferred amount is 400-2000 mJ/cm$^2$.

(Polarizing Plates)

The polarizing plate of the present invention and the liquid crystal display device of the present invention, employing the same will now be described.

The polarizing plate of the present invention is characterized to be a polarizing plate in which a polarizer is sandwitched between two sheets of transparent supports A and B according to the present invention. In the liquid crystal display device of the present invention, the polarizing plate of the present invention is laminated onto at least one surface of a liquid crystal cell.

<Polarizer>

A polarizer, which is a main component of a polarizing plate, is the element which only transmits light having a polarization plane in the definite direction. The representative polarizing film, which is currently known, is a polyvinyl alcohol based polarizing film, which include two types, one which is prepared by dying a polyvinyl alcohol based film with iodine and the other which is prepared by dying the same with dichroic dyes.

Further, it is preferable in the present invention that the film formation is conducted employing ethylene-modified polyvinyl alcohol at an ethylene unit content of 1-4 mol %, a degree of polymerization of 2,000 and a saponification ratio of 99.0-99.99 mol %, and is prepared employing an ethylene-modified polyvinyl alcohol film at a hot-water, cutting temperature of 66-73° C. Further, in order to decrease color spots, it is more preferable that the difference of the hot water cutting temperature between two points 5 cm apart in the TD direction is at most 1° C. Still further, in order to decrease color spots, it is still more preferable that the difference of the hot water cutting temperature between two points 1 cm apart in the TD direction is at most 0.5° C. Further, in order to decrease color spots, it is particularly preferable that the film thickness prior to stretching is 10-50 μm.

Employed as the ethylene-modified polyvinyl alcohol (being the ethylene-modified PVA) may be those which are prepared in such a manner that ethylene-vinyl ester based polymers, prepared by copolymerizing ethylene and vinyl ester based monomers, are saponified in which vinyl ester units are employed as vinyl alcohol units. Examples of the above vinyl ester based monomers include vinyl formate, vinyl acetate, vinyl propionate, vinyl valerate, vinyl laurate, vinyl stearate, vinyl benzoate, vinyl pivaliate, and versatic acid vinyl esters. Of these, it is preferable to employ vinyl acetate.

The content (being the copolymerized amount of ethylene) ethylene units in the ethylene-modified PVA is commonly 1-4 mol %, is preferably 1.5-3 mol %, but is more preferably 2-3 mol %. When the content of the ethylene units is less than 1 mol %, the polarizing performance, the durability enhancing effects, and color spot decreasing effects of the resulting polarizing film are undesirably degraded. On the other hand, when it exceeds 4 mol %, affinity of the ethylene-modified PVA to water is reduced, whereby the uniformity the film surface is undesirably degraded to tend to cause the formation of color spots of the polarizing film.

Further, during copolymerization of ethylene with vinyl ester based monomers, if desired, it is possible to copolymerize copolymerizable monomers in the range (at a ratio of preferably at most 15% by mole, but more preferably at most 5% by mole) in which the effects of the present invention is adversely affected.

Examples of such copolymerizable monomers with vinyl ester based monomers include olefins having 3-30 carbon atoms such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfinic acid and salts thereof, acrylamidopropyldimethylanine and salts thereof, N-methylol acrylamide and derivatives thereof; methacrylamide derivatives such as methacrylamide, N-methylmethacrylamide, N-ethylmethacrylamide, methacrylamidopropane sulfonic acid and salts thereof, methacrylamidopropyldimethylamine and salts thereof, or N-methylol methacrylamide and derivatives thereof; N-vinylamides such as N-vinylformamide, N-vinylacetamide, or n-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitriles such as acrylonitrile or methacrylonitrile; halogenated vinyls such as vinyl chloride, vinylidene chloride, vinyl fluoride, or vinylidene fluoride; allyl compounds such as allyl acetate or allyl chloride; maleic acid, and salts and esters thereof; itacbnic acid, and salts and esters thereof; vinylsilyl compounds such as vinylmethoxysilane; and N-vinylamides such as isopropenyl acetate, N-vinylformamide, N-vinylacetamide, or N-vinylpyrrolidone.

The degree of polymerization of ethylene-modified PVA composing the polarizer and of PVA of the polarizing film is commonly 2,000, is preferably 2,500, but is more preferably 2,000 in terms of polarizing performance and durability. When the degree of polymerization of ethylene-modified PVA is at most 2,000, the polarizing performance and durability of the polarizing film are undesirably degraded. On the other hand, the degree of polymerization of at most 4,000 is preferred since color spots of the polarizer are hardly formed.

The degree of polymerization of the ethylene-modified PVA refers to the weight average degree of polymerization. This weight average degree of polymerization is a value obtained by performing GPC measurement at 40° C. employing hexafluoroisopropanol (HFIP) added with 20 milli-mol/liter of sodium trifluoroactate in the moving phase employing monodispersed PMMA as a standard product.

In view of polarization performance and durability of a polarizing film, the ratio of saponification of the ethylene-modified PVA constituting the polarizer is preferably 99.0-99.99 mol %, is more preferably 99.9-99.99 mol %, but is most preferably 99.95-99.99 mol %.

Employed as methods to produce a ethylene-modified film may be employed, other than a film casting method based on a melt extrusion system employing water-containing ethylene-modified PVA, for example, an extrusion casting method employing an ethylene-modified PVA solution prepared by dissolving ethylene-modified PVA in solvents, a wet system casting method (ejected into poor solvents), a gel casting method (after an ethylene-modified PVA solution is temporarily cooled and gelled, solvents are removed via extraction and an ethylene-modified PVA film is prepared), as well as methods of combinations of these. Of these, in view of preparation of excellent ethylene-modified PVA film, preferred are the extrusion casting method and the melt extrusion method. The resulting ethylene-modified PVA film is, if desired, dried and thermally treated.

Cited as solvents to dissolve the ethylene-modified PVA employed during production of ethylene-modified PVA film may, for example, be dimethylsulfoxide, dimethylformamide, dimethylacetamide, N-methylpyrrolidone, ethylene glycol, glycerin, propylene glycol, triethylene glycol, tetraethylene glycol, trimethylolpropane, ethylenediamine, diethylenetriamine, and water. These may be employed individually or in combination of at least two types. Of these, suitably employed is dimethylsulfoxide and water, or a mixed solvent of glycerin and water.

The ratio of ethylene-modified PVA, incorporated in an ethylene-modified PVA solution or water-containing ethylene-modified PVA employed during production of the ethylene-modified film, varies depending on the degree of polymerization of the ethylene-modified PVA, but is commonly 20-70% by weight, is preferably 25-60% by weight, but is more preferably appropriately 30-55% by weight, but is most preferably 35-50 by weight. When the ratio of the ethylene-modified PVA exceeds 70% by weight, viscosity of the ethylene-modified PVA solution or the water-containing ethylene-modified PVA becomes excessively high, whereby it becomes difficult to prepare a film without foreign matter and defects due to difficult filtration and defoaming. On the other hand, when the ratio of the ethylene-modified PVA is at most 20% by weight, the viscosity of the ethylene-modified PVA solution or the water-containing ethylene-modified PVA becomes excessively low, whereby it becomes difficult to prepare a PVA film at the targeted thickness. Further, if desired, plasticizers, surfactants, and dichroic dyes may be incorporated in the above ethylene-modified PVA solution or water-containing ethylene-modified PVA.

During production of the ethylene-modified PVA film, it is preferable to incorporate polyhydric alcohols as a plasticizer. Examples of polyhydric alcohols include ethylene glycol, glycerin, propylene glycol, diethylene glycol, diglycerin, triethylene glycol, tetraethylene glycol, and trimethylolpropane. These may be employed individually or in combinations of at least two types. Of these, in view of orientation enhancement effects, diglycerin, ethylene glycol, and glycerin are preferable.

The addition amount of polyhydric alcohols is preferably 1-30 parts by weight with respect to 100 parts by weight of the ethylene-modified PVA, is more preferably 3-25 parts by weight, but is most preferably 5-20 parts by weight. When the added amount is at most 1 part by weight, dying properties and orientation properties are occasionally degraded, while when it exceeds 30 parts by weight, the ethylene-modified film becomes excessively flexible, whereby handling properties tend to be degraded.

During production of the ethylene-modified PVA film, it is preferable to incorporate surfactants. The types of surfactants are not particularly limited, but nonionic or cationic surfactants are preferred. Examples of suitable anionic surfactants include carboxylic acid types such as potassium laurate, sulfuric acid ester types such as octyl sulfate, and sulfonic acid types such as dodecylbenznene sulfonate. Examples of suitable nonionic surfactants include alkyl ether types such as polyoxyethylene oleyl ether; alkyl phenyl ether types such as polyoxyethylene octyl phenyl ether; alkyl ester types such as polyoxyethylenelaurate; alkylamine types such as polyoxyethylene lauryl aminoether; alkylamide types such as polyoxyethylene lauric acid amide; polypropylene glycol ether types such as polyoxyethylene polyoxypropylene ether; alkanol amide types such as oleic acid diethanolamide; and allyl phenyl ether types such as polyoxyalkylene phenyl ether. These surfactants may be employed singly or in combination with at least two types.

The addition amount of surfactants is preferably 0.01-1 part by weight with respect to 100 parts by weight of the ethylene-modified PVA, is more preferably 0.02-0.5 part by weight, but is most preferably 0.05-0.3 part by weight. When the added amount is at most 0.01 part by weight, effects to improve film casting properties and peeling properties are hardly exhibited, while when it exceeds 1 part by weight, surfactants are dissolved out onto the surface of the ethylene-modified PVA film to result in blocking, whereby handling properties tend to be degraded.

The hot-water cutting temperature of the ethylene-modified PVA film is preferably 66-73° C., is more preferably 68-73° C., but is most preferably 70-73° C. When the hot-water cutting temperature of the ethylene-modified PVA film is at most 66° C., a state occurs in which a film, which starts dissolution, is stretched whereby the polarization performance becomes insufficient due to reduced tendency of molecular orientation. On the other hand, when the hot-water cutting temperature is at least 73° C., the film tends not to be stretched, whereby the polarization performance of the polarizing film is undesirably degraded. When the ethylene-modified PVA film is dried and thermally treated, it is possible to control the hot-water cutting temperature of the film by varying the temperature and time of the above treatments.

The thickness of the ethylene-modified PVA film employed to prepare a polarizer is preferably 10-50 μm, but is more preferably 20-40 μm. When the thickness is at most 10 μm, uniform stretching is hardly performed due to excessively low film strength, whereby color spottings of the polarizing film tend to be generated. On the other hand, when the thickness exceeds 50 μm, during production of a polarizing film via uniaxial orientation of the ethylene-modified PVA film, the thickness tends to vary due to neck-in at the ends, whereby color spottings of the polarizing film tend to be undesirably enhanced.

Further, to produce a polarizing film employing an ethylene-modified PVA film, for example, the ethylene-modified PVA film may be dyed, uniaxially stretched, fixed and dried, if desired, thermally treated. The order of the dying, uniaxial stretching, and fixing is not particularly limited. Further, the uniaxial stretching may be repeated at least twice.

Dying may be performed at any time such as prior to uniaxial stretching, during uniaxial stretching, or after uniaxial stretching. Employed as dyes for dying are dichroic dyes such as iodine-potassium iodide; Direct Black 17, 19, and 154; Direct Brown 44, 106, 195, 210, and 223; Direct Red 2, 23, 28, 31, 37, 39, 79, 81, 240, 242, and 247; Direct Blue 1, 15, 22, 78, 90, 98, 151, 168, 202, 236, 249, and 270; Direct Violet 9, 12, 51, and 98; Direct Green 1 and 85; Direct Yellow 8, 12, 44, 86, and 87; and Direct Orange 26, 39, 106, and 107. These may be employed singly or in combination with at least two types. Dying is commonly performed by immersing a PVA film into a solution incorporating the above dyes. Alternatively, the above dyes may be blended into a PVA film during casting. The above dying conditions and methods are not particularly limited.

It is possible to conduct uniaxial stretching employing either a wet stretching method or a dry heat stretching method, and in heated water (a solution incorporating the above dyes or the fixing bath, described below, may be employed) or in an atmosphere employing the ethylene-modified PVA film after water absorption. The temperature during stretching is not particularly limited. When the ethylene-modified PVA film is stretched in heated water (being wet system stretching), the stretching temperature is preferably 30-90° C., while in the case of dry heat stretching, it is preferably 50-180° C. The stretching factor (the total stretching factor in the case of multistage uniaxial stretching) is preferably at least 4 in terms of polarization performance of a polarizing film, but is most preferably at least 5. The upper limit of the stretching factor is not particularly limited. However, the stretching factor is preferably at least 8, since uniform stretching is readily performed. The film thickness after stretching is preferably 2-20 μm, is more preferably 10-20 μm, but is most preferably 5-15 μm.

To strengthen adsorption of the above dyes onto the ethylene-modified PVA film, a fixing treatment is frequently conducted. Commonly, boric acid and/or boron compounds are added to a treatment bath employed for the fixing treatment. Alternatively, if desired, iodine compounds may be incorporated in the treatment bath.

Drying of a prepared polarizer is preferably performed between 30-150° C., but is more preferably performed between 50-150° C.

An optically-transparent protective layer, exhibiting desired mechanical strength, is adhered to one or both sides or side of the polarizer, prepared as above, whereby a polarizing plate is prepared. Listed as adhesives for the above adhesion may be PVA based and urethane based adhesives. Of these, the PVA based adhesives are preferable.

It is possible to prepare the polarizing plates employing common methods. It is preferable that the reverse side of the cellulose ester films (a) and (b) of the present invention is subjected to an alkali saponification treatment and the resulting cellulose ester film is adhered, employing an aqueous completely-saponified polyvinyl alcohol solution, to at least one surface of a polarizing film which has been prepared by being immersed into an iodine solution and subsequently being stretched.

The cellulose ester film of the present invention or another polarizing plate protective film may be employed on the other surface. Employed as a polarizing plate protective film used on the other surface, in place of the cellulose ester film of the present invention, may be commercially available cellulose ester film. For example, preferably employed as commercially available cellulose ester films are KC8UX2M, KC4UX, KC5UX, KC4UY, KC8UY, KC12UR, KV8UCR-3, KV8UCR-4, KC4FR, KC8UY-HA, and KC8UX-RHA (all produced by Konica Minolta Opt, Inc.). Also preferably employed are Fujitac TD80UF, Fujitac T80UZ, Fujitac T40UZ (anti-reflection films, CV film Clearview, produced by Fuji Photo Film Co., Ltd.).

It is preferable that a polarizing plate protective film applied for another surface includes a hard coat layer or an anti-glare film having a thickness of 8-20 μm. Preferably employed are polarizing plate protective films including hard coat layers or anti-glare films described in Japanese Patent O.P.I. Publication 2003-114333, Japanese Patent O.P.I. Publication 2004-203009, Japanese Patent O.P.I. Publication 2004-354699 and Japanese Patent O.P.I. Publication 2004-354828. Further, it is preferred that the polarizing plate protective film includes an anti-glare film possessing at least a low refractive index layer provided on the hard coat layer or the anti-glare film, and particularly preferred that the low refractive index layer contains hollow particles.

Alternatively, it is preferable to use a polarizing plate protective film, also functioning as an optical compensating film having an optical anisotropic layer, which is prepared by orienting liquid crystal compounds such as a discotic liquid crystal, a rod-shaped liquid crystal, or a cholesteric liquid crystal. It is possible to form the optical anisotropic layer employing the method described in Jpanese patent O.P.I. Publication No. 2003-98348. By employing the combination of the cellulose ester film of the present invention, it is possible to obtain polarizing plates which exhibit excellent flatness and viewing angle increasing effects. Films such as a cyclic olefin resin, an acrylic resin, polyester and polycarbonate in place of the cellulose ester film may be employed as the polarizing plate protective film provided on the other surface. It is preferred n this case that adhering treatment of a polarizing plate is conducted via an appropriate adhesion layer because of low saponification suitability.

Since the polarizer is uniaxially (commonly longitudinally) stretched, during its standing at high temperature and high humidity, it contracts in the stretching direction (commonly the longitudinal direction) and elongates in the lateral direction. Specifically, contraction of the polarizing film in the stretching direction is greater. Commonly, adhesion is performed so that the stretching direction of the polarizer and the casting direction (being the MD direction) of the Polarizing Plate Protective Film A are identical. Consequently, when the thickness of the polarizing plate protective film is decreased, it is particularly important to decrease its elongation and contraction ratio in the casting direction. The cellulose ester film of the present invention exhibits excellent dimensional stability, whereby it is appropriately employed as a polarizing plate protective film.

Further, it is possible to constitute a polarizing plate in such a manner that a protective film is adhered onto one side of the polarizing plate and a separate film is adhered to the other side. The protective film and the separate film are employed to protect the polarizing plate during shipment of the polarizing plate and inspection of the products. In such a case, the protective film is adhered to protect the surface of the polarizing plate and is employed on the opposite side to which another polarizing plate is adhered. The separate film is employed to cover the adhesion layer which is adhered to the liquid crystal plate and employed on the side to which the polarizing plate is adhered to the liquid crystal cell. A phase difference film may also be placed between the liquid crystal cell and the polarizing plate. Though the phase difference film is preferably prepared by stretching or contracting polycarbonate, modified polycarbonate, cyclic olefin and the like employing a commonly known method, it is not limited since the method is selected via balancing of a LCD viewing angle, durability and cost.

[Transverse Switching Mode Type Liquid Crystal Display (IPS)]

A liquid crystal display of the present invention exhibiting excellent visibility and increased viewing angle can be produced by incorporating a polarizing plate of the present invention in a commercially available IPS (In-plane switching) mode type liquid crystal display.

The in-plane switching mode type liquid crystal display (IPS) generally includes a fringe-field switching mode type liquid crystal display (FFS) [refer to Jpn. J. Appl. Phys. Vol. 42 (2003) pp 2752]. The IPS of the present invention also includes FSS, and similarly to the IPS, a polarizing plate of the present invention can be incorporated in the FSS to produce a liquid crystal display having the similar effects, as described above.

EXAMPLE

The following describes the present invention with reference to examples, without the present invention being restricted thereto.

Example 1

(Synthesis of Acryl Polymer)
(Synthesis of AC1 through AC6)

The following steps were taken to prepare AC1: 40 g of monomer mixture (type and proportion specified in Table 1), 3.0 g of mercapto propionic acid of chain transfer agent and 30 g of toluene were put in a glass flask equipped with a stirring machine, two dropping funnels, gas supply tube and thermometer. The temperature was raised to 90 degrees Celsius, and 60 g of the monomer mixture (types and proportions specified in Table 1) was dropped through one of the dropping funnels in 3 hours. At the same time, 0.6 g of azobisisobutyronitrile dissolved in 14 g of toluene was also dropped through another dropping funnels for 3 hours. After that, 0.6 g of azobisisobutyronitrile dissolved in 56 g of toluene 56 g was further dropped in 2 hours, and reaction was continued for 2 hours, whereby the aforementioned AC1 was obtained. AC2 through AC6 were prepared by taking the same steps as those in preparing the AC1, except that the amount of the mercapto propionic acid of the chain transfer agent to be added was changed.

The weight average molecular weights of the AC1 through AC6 were measured according to the following method. The results of measurement are given in Table 1.

MA, MMA, HEMA and HEA given in Table 1 are abbreviations for the following compounds:
MA: methylacrylate
MMA: methacrylic acid methyl
HEMA: 2-hydroxyethylmethacrylate HEA: β-hydroxyethylacrylate (Measurement of Molecular Weight)

The weight average molecular weight was measured using a high-speed liquid chromatography.

The following introduces the conditions for measurement:
Solvent: methylene chloride
Column: Shodex K806, K805 and K803G (Three pieces manufactured by Showa Denko K.K. were connected for use)
Column temperature: 25 degrees Celsius
Sample concentration: 0.1% by mass
Detector: RI Model 504 (manufactured by GL Science Co., Ltd.)
Pump: L6000 (manufactured by Hitachi Limited)
Flow rate: 1.0 ml/min.
Calibration curve: The calibration curve using 13 samples of the standard polystyrene STK standard polystyrene (manufactured by Toso Co., Ltd.) was employed, wherein Mw=1000000 through 500. These 13 samples were placed at an approximately equally spaced interval.

(Synthesis of AC7 and AC8)

The bulk polymerization was conducted according to the polymerization procedure disclosed in the Japanese Non-Examined Patent Publication 2000-344823. While putting the following methyl methacrylate and Ruthenoc into a flask provided with a stirring device, nitrogen gas supply tube, temperature meter, inlet and recirculation cooling tube, the contents was heated up to 70 degrees Celsius. Then half the following β-mercaptopropionic acid having undergone sufficient nitrogen gas replacement was put into the flask while being stirred. Subsequent to addition of the β-mercaptopropionicacid, the contents in the flask being stirred were kept at 70 degrees Celsius, and polymerization was carried out for 2 hours. Further, the remaining fifty percent of the following β-mercaptopropionic acid having undergone sufficient nitrogen gas replacement was added. The contents in the flask being stirred were kept at 70 degrees Celsius, and polymerization was carried out for 4 hours. The reaction product temperature was set back to room temperature. After 20 parts by mass of a tetrahydrofuran solution containing 5% by mass of benzoquinone was added to the reaction product, polymerization was discontinued. The temperature of the polymerization product was gradually reduced down to 80 degrees Celsius under the pressure reduced by an evaporator while tetrahydrofuran, residual monomer and residual thiol compound were removed. Following these steps, acryl polymers AC7 and AC8 were produced.

| | |
|---|---|
| Methyl acrylate or methyl methacrylate | 100 parts by mass |
| Ruthenocence (metallic catalyst) | 0.05 parts by mass |
| β-mercapto propionic acid | 12 parts by mass |
| (Preparation of cellulose ester film 1) | |
| (Dope composition) | |
| Cellulose triacetate (abbreviated as AC in Table) (degree of acetification: 61.5%, Mn: 110000, Mw/Mn = 2.0) | 100 parts by mass |
| Plasticizer 1: AC5 | 5 parts by mass |
| Plasticizer 2: ATBC | 5 parts by mass |
| Methylene chloride | 430 parts by mass |
| Ethanol | 40 parts by mass |

A dope was prepared by taking the steps of putting a dope composition into an enclosed container, heating the solution up to 70 degrees Celsius, and stirring it until the cellulose triacetate (TAC) was completely dissolved. The time taken for dissolution was 4 hours. After having been filtered, the dope composition was uniformly flow-cast over the 22-degrees Celsius stainless steel band support at a dope temperature of 35 degrees Celsius by a belt casting apparatus. The stainless steel band support had a temperature of 20 degrees Celsius.

After having been dried to the level of permitting the removal, the dope was removed from the stainless steel band support. The residual amount of solvent in the dope at this time was 80%. Three minutes were required from the dope casting to removal. After removal from the stainless steel band support, the web was stretched at a drawing magnification of ×1.03 in the cross direction by a tenter, and was dried at 120 degrees Celsius. The web having been held in the cross direction was released. While being conveyed by multiple rolls, the web was dried at 120 degrees Celsius. Then it was dried in the drying zone having a temperature of 135 degrees Celsius, where the drying operation was completed. A knurled portion having a width of 10 mm and a height of 5 μm were provided on both ends of the film, whereby a cellulose ester film 1 having a film thickness of 40 μm was produced. The film width was 1300 mm, and take-up length was 3000 μm. The initial take-up tension was 150N/1300 mm and the final one was 100N/1300 mm.

(Preparation of Cellulose Ester Films 2 through 4, 6 through 9, 11 through 23, 28 through 29, and 31 through 34)

The cellulose ester films 2 through 4, 6 through 9, 11 through 23, 28 through 29 and 31 through 34 were prepared according to the same procedure as that for the preparation of cellulose ester film 1, except that the type and amount of the plasticizers 1 and 2 were changed to those listed in Tables 1 and 2.

(Preparation of Cellulose Ester Films 5, 10 and 30)

The cellulose ester films 5, 10 and 30 were prepared according to the same procedure as that for the preparation of cellulose ester film 1, except that the type and amount of the plasticizers 1 and 2 were as listed in Tables 1 and 2, the film thickness was as given in Table 2, and the cellulose acetate propionate (described as CAP in Table) (acetyl group replacement ratio: 2.0; propionyl group replacement ratio: 0.9, Mn: 80000, Mw/Mn=2.5) was used instead of 100 parts by mass of the cellulose triacetate (degree of acetification: 61.5%)

(Preparation of Cellulose Ester Films 24 Through 27)

The cellulose ester films 24 through 27 were prepared by according to the same procedure as that for the preparation of cellulose ester film 1, except that the type and amount of the plasticizers 1 and 2 were as listed in Tables 1 and 2, the film thickness was as listed in Table 2, and following substances were added:

| | |
|---|---|
| TINUVIN 109 (manufactured by Ciba Specialty Chemicals K.K) | 1.5 parts by mass |
| TINUVIN 171 (manufactured by Ciba Specialty Chemicals K.K) | 0.7 parts by mass |

TABLE 1

| | -(Xa)m-(Xb)n-(Xc)p- | | | | | | |
|---|---|---|---|---|---|---|---|
| Compound | Xa | m | Xb | n | Xc | p | Mw |
| AC1 | MMA | 80 | HEA | 20 | — | 0 | 2000 |
| AC2 | MMA | 80 | HEA | 20 | — | 0 | 8000 |
| AC3 | MMA | 80 | HEA | 20 | — | 0 | 12000 |
| AC4 | MMA | 80 | HEMA | 20 | — | 0 | 8000 |

TABLE 1-continued

| AC5 | MMA | 90 | HEMA | 10 | — | 0 | 4000 |
|---|---|---|---|---|---|---|---|
| AC6 | MMA | 90 | HEA | 10 | — | 0 | 30000 |

-(Ya)k-(Yb)q-

| | Ya | k | Yb | q | Mw |
|---|---|---|---|---|---|
| AC7 | MMA | 100 | — | 0 | 500 |
| AC8 | MMA | 100 | — | 0 | 1000 |

MA: methylacrylate
MMA: methacrylic acid methyl

TABLE 1-continued

| E3 | $CH_3COO$ | $C_2H_4$—O | CO—$C_2H_4$—COO | 8500 |
|---|---|---|---|---|
| | | $C_4H_8$—O | CO—$C_4H_8$—COO | |
| E4 | $C_{11}H_{23}COO$ | $C_2H_4$—O | CO—$C_2H_4$—COO | 30000 |
| | | $C_{12}H_{24}$—O | CO—$C_{10}H_{20}$—COO | |

The aforementioned alkyl group and alkylene group are normal (n).

$B_2$-(G-A )$_n$-A-$B_2$

| Compound | $B_2$ | G-A | G | Mw |
|---|---|---|---|---|
| E5 | $C_2H_5O$ | CO—$C_2H_4$—COO | $C_2H_4$—O | 1000 |
| E6 | $C_2H_5O$ | CO—COO | $C_4H_8$—O | 8000 |
| E7 | $C_2H_5O$ | CO—COO | $C_2H_4$—O | 25000 |

TABLE 2

| Cellulosic ester film number | Plasticizer 1 | Amount to be added (parts by mass) | Plasticizer 2 | Amount to be added (parts by mass) | Cellulosic ester | Amount to be added (parts by mass) | Film thickness (μm) | Rt (nm) | Ro (nm) |
|---|---|---|---|---|---|---|---|---|---|
| 1 | AC5 | 5 | ATBC | 5 | TAC | 100 | 40 | 20 | 5 |
| 2 | AC7 | 15 | ATBC | 10 | TAC | 100 | 40 | −5 | 1 |
| 3 | AC5 | 10 | AC8 | 5 | TAC | 100 | 40 | −3 | 0 |
| 4 | AC5 | 10 | E1 | 3 | TAC | 100 | 40 | 10 | 3 |
| 5 | AC5 | 10 | AC8 | 5 | CAP | 100 | 40 | 2 | 1 |
| 6 | TPDO | 5 | TPT | 5 | TAC | 100 | 40 | 5 | 2 |
| 7 | TPDO | 5 | ATBC | 10 | TAC | 100 | 70 | −3 | 2 |
| 8 | TPDO | 10 | AC5 | 5 | TAC | 100 | 80 | −5 | 3 |
| 9 | TPDO | 10 | AC8 | 10 | TAC | 100 | 60 | −15 | 5 |
| 10 | TPDO | 5 | TPT | 5 | CAP | 100 | 40 | 5 | 3 |
| 11 | AC1 | 10 | AC8 | 5 | TAC | 100 | 40 | 0 | 1 |
| 12 | AC2 | 5 | AC7 | 5 | TAC | 100 | 40 | 3 | 2 |
| 13 | AC5 | 10 | AC8 | 5 | TAC | 100 | 80 | −10 | 3 |
| 14 | AC4 | 15 | ATBC | 5 | TAC | 100 | 25 | −2 | 5 |
| 15 | AC6 | 10 | ATBC | 15 | TAC | 100 | 80 | −30 | 10 |
| 16 | AC5 | 10 | TMPB | 5 | TAC | 100 | 40 | 25 | 8 |
| 17 | E1 | 10 | TMPB | 5 | TAC | 100 | 40 | 20 | 5 |
| 18 | E2 | 15 | AC3 | 10 | TAC | 100 | 35 | 10 | 2 |
| 19 | E3 | 10 | AC3 | 10 | TAC | 100 | 40 | 15 | 3 |
| 20 | E4 | 5 | AC7 | 10 | TAC | 100 | 35 | 5 | 1 |
| 21 | E5 | 15 | AC7 | 10 | TAC | 100 | 80 | −5 | 2 |
| 22 | E6 | 10 | AC8 | 10 | TAC | 100 | 60 | −3 | 2 |
| 23 | E7 | 5 | AC8 | 10 | TAC | 100 | 80 | −1 | 1 |
| 24 | TMPB | 4.5 | EPEG | 5 | TAC | 100 | 40 | 32 | 1 |
| 25 | TMPB | 4.5 | EPEG | 5 | TAC | 100 | 80 | 36 | 1.2 |
| 26 | TMPB | 4.5 | ATBC | 5 | TAC | 100 | 40 | 31 | 0.8 |
| 27 | TMPB | 4.5 | ATBC | 5 | TAC | 100 | 80 | 34 | 1.1 |
| 28 | TPP | 10 | EPEG | 5 | TAC | 100 | 80 | 52 | 1 |
| 29 | TPP | 5 | ATBC | 5 | TAC | 100 | 40 | 45 | 2 |
| 30 | TPP | 5 | ATBC | 5 | CAP | 100 | 40 | 47 | 2 |
| 31 | BDP | 3 | TPP | 10 | TAC | 100 | 40 | 58 | 5 |
| 32 | AC1 | 3 | ATBC | 2 | TAC | 100 | 40 | 25 | 5 |
| 33 | AC5 | 15 | ATBC | 15 | TAC | 100 | 40 | −35 | 8 |
| 34 | AC5 | 15 | AC ( | 15 | TAC | 100 | 40 | −25 | 12 |

TPP: triphenyl phosphate,
BDP: bisphenyl diphenyl phosphate
TPT: trimethylol propane triacetate
TPDO: trimethylol propane diacetate octanoate
ATBC: acetyl tributyl citrate
TMPB: trimethylol propane tribenzoate
EPEG: ethyl phthalyl ethyl glycolate

TABLE 1-continued

HEMA: 2-hydroxyethylmethacrylate
HEA: β-hydroxyethylacrylate $B_1$-(G-A-)$_m$G-$B_1$

| Compound | $B_1$ | G | A | Mw |
|---|---|---|---|---|
| E1 | $CH_3COO$ | $C_2H_4$—O | CO—$C_2H_4$—COO | 500 |
| E2 | $C_7H_{15}COO$ | $C_2H_4$—O | CO—$C_2H_4$—COO | 3000 |

(Preparation of Polarizer P1)

A polarizer P1 was prepared by immersing a 120 μm-diameter polyvinyl alcohol film in 100 parts by mass of aqueous solution containing 1 parts by mass of iodine and 4 parts by mass of boric acid at 50 degrees Celsius and drawing it at a drawing magnification of ×4. The film had a thickness of 25 μm.

(Preparation of Polarizer P2)

An ethylene denatured polyvinyl alcohol film having a thickness of 40 μm was prepared by taking the following steps: 100 parts by mass of ethylene denatured polyvinyl alcohol (the content of ethylene unit: 2.1 mol %; degree of saponification: 99.92 mol %; degree of polymerization: 3000) was impregnated with 10 parts by mass of glycerine and 200 parts by mass of water, and was melted, kneaded and defoamed. The solution was then subjected to melt-extrusion onto a metallic roll from a T-die, and was dried, whereby the aforementioned ethylene denatured polyvinyl alcohol film was produced.

A polarizer 1 was prepared by processing the aforementioned ethylene denatured polyvinyl alcohol film continuously in the order of pre-swelling, dyeing, uniaxial drawing, fixing, drying and heating. To put it more specifically, the steps of immersing the ethylene denatured polyvinyl alcohol film in water of 30 degrees Celsius for 60 seconds was taken to let the film pre-swell, and then immersing the pre-swollen film in an aqueous solution which contained 40 g/liter of boric acid, 0.4 g/liter of iodine, and 60 g/liter of potassium iodide at 35 degrees Celsius for 2 minutes. These steps were followed by the further steps of uniaxial-drawing the film up to 6 times in an aqueous solution which contained 4% of boric acid, and immersing the film in an aqueous solution which contained 60 g/liter of potassium iodide, 40 g/liter of boric acid, and 10 g/liter of zinc chloride at 30 degrees Celsius for 5 minutes to fix the same. Then the fixed ethylene denatured polyvinyl alcohol film was taken out of the solution. After that, this film was dried by hot air of 40 degrees Celsius and was further heated at 100 degrees Celsius for 5 minutes.

The obtained polarizer P2 has a transmittance factor of 43%, a polarization degree of 99.9% and a film thickness of 15 μm.

(Preparation of Polarizing Plates 1 through 48)

An alkali-treated film was produced by taking the following steps: The aforementioned cellulose ester films 1 through 34 were subjected to alkali treatment an aqueous solution containing 2.5 mol/L of sodium hydroxide at 40 degrees Celsius for 60 seconds. These films were then rinsed in water for three minutes to form a saponified layer, whereby the aforementioned alkali-treated film was obtained.

Using the completely saponified aqueous solution containing 5% polyvinyl alcohol as a agglutinant, the above prepared polarizers P1 and P2 (described as PVA in Table) and alkali-treated cellulose ester films 1 through 34 were bonded in the composition listed in Table 3 as the first sheet (front) and second sheet (rear), respectively, whereby polarizing plates 1 through 48 were produced.

[Evaluation]

The aforementioned cellulose ester films 1 through 34 having been prepared were evaluated as follows:

(Measurement of Ro and Rt)

The average refraction indexes of cellulose ester film was measured by an Abbe refractometer (4T) and film thicknesses by a commercially available micrometer.

The film was kept in a test environment of 23 degrees Celsius and 55% RH for 24 hours, measured their retardations at a wavelength of 590 nm by an automatic double refractometer KOBRA-21ADH (manufactured by Oji Scientific Instruments), assigned the obtained average refraction index and film thickness values to the following equations, and calculated in-plane retardation (Ro), retardation (Rt) along the thickness of the film.

$$Ro=(nx-ny)\times d \quad \text{Formula (I):}$$

$$Rt=((nx+ny)/2-nz)\times d \quad \text{Formula (II):}$$

where $nx$, $ny$ and $nz$ represent refractive indexes of the indicatrixes in the direction of the major axes x, y and z, respectively, $nx$ and $ny$ indicate the refractive index in the film surface, and $nz$ shows the refractive index of the film along the thickness. $nx$ is equal to or greater than $ny$, and d denotes the thickness (nm) of the film.

(Rt Stability)

The above prepared cellulose ester film was processed in an environment of 23 degrees Celsius and 80% RH for 10 hours, and measured the Rt value. Furthermore, they processed this film in an environment of 23 degrees Celsius and 20% RH for 10 hours, and evaluated in four ranks according to the following criteria:

Δ Rt (nm)=Rt (23 degrees Celsius, 20% RH)−Rt (23 degrees Celsius, 80% RH)

A: ΔRt less than 10 nm
B: ΔRt 10 through 15 nm excl.
C: ΔRt 15 through 20 nm excl.
D: ΔRt 20 nm or more The above prepared polarizing plates 1 through 48 were evaluated as follows:

(Deterioration of Polarizing Plate)

The above prepared polarizing plate was processed in an environment of 80 degrees Celsius and 90% RH for 120 hours, measured transmittance before and after the processing, and evaluated in 4 ranks according to the following criteria:

Difference in transmittance ΔT (%)=Td (transmittance after processing at high temperature and humidity)−T0 (transmittance before processing at high temperature and humidity)

A: ΔT 1% or less
B: ΔT 1% through 5% excl.
C: ΔT 5% through 10% excl.
D: ΔT 10% or more (Changes in Polarizing Plate Dimensions)

A mark (cross) was attached at two positions of each of the above prepared polarizing plates in the direction of absorption axis of the polarizer, processed the plates in an environment of 80 degrees Celsius and 90% RH for 120 hours, measured the distance between the marks (crosses) before and after processing by an optical microscope, and evaluated in six ranks according to the following criteria:

Dimensional change rate (%)=[(a1−a2)/a1]×100
a1: distance before heat treatment
a2: distance after heat treatment A: dimensional change rate less than 0.1%
B: dimensional change rate 0.1% through 0.5% excl.
C: dimensional change rate 0.5% through 1.0% excl.
D: dimensional change rate 1.0% through 1.5% excl.
E: dimensional change rate 1.5% through 2.0% excl.
F: dimensional change rate 2.0% or more (Preparation of Liquid Crystal Display Apparatus)

The liquid crystal panel for measuring the angle of visibility was produced according to the following procedure, and was evaluated for the characteristics thereof as a liquid crystal display apparatus.

The polarizing plates only on the pre-bonded front side (closer to the observer) of a liquid crystal TV set Wooo W17-LC50 (manufactured by Hitachi Limited) as an IPS mode liquid crystal display apparatus was separated, and bonded the above prepared polarizing plates A 1 through 45, and polarizing plate B each of the above prepared polarizing plates 1 through 48 onto the glass surface of the liquid crystal cell.

In this case, polarizing plate was bonded in such a direction that the absorption axis would be oriented in the same direction as the pre-bonded polarizing plate, and that the second polarizing plate protective film (rear side) would be located on the liquid crystal cell side. Liquid crystal display apparatuses 1 through 48 were produced according to this procedure.

The liquid crystal display apparatuses 1 through 48 were evaluated as follows:

The angle of visibility of the liquid crystal display apparatus was measured in an environment of 23 degrees Celsius and 55% RH using the EZ-Contrast 160D manufactured by ELDIM. The area where the contrast (proportion of white to black displays) was 20 or more was regarded as having an effective angle of visibility. Then the aforementioned polarizing plate was processed in an environment of 60 degrees Celsius and 90% RH for 500 hours, and measurement was made in the same manner. Furthermore, the aforementioned polarizing plate having been processed for 1000 hours in an environment of 60 degrees Celsius and 90% RH was measured in the same manner, and was evaluated in 4 ranks according to the following criteria:

A: No fluctuation in effective angle of visibility
B: Slight fluctuation in effective angle of visibility
C: Reduced effective angle of visibility
D: Considerably reduced effective angle of visibility (CM (Light Leakage))

The liquid crystal display apparatuses 1 through 48 were prepared by bonding the polarizing plates 1 through 48 in the same manner as that in the evaluation of the aforementioned angle of visibility. These liquid crystal display apparatuses 1 through 45 were processed at 60 degrees Celsius for 300 hours. After that, the environment was set back to 23 degrees Celsius and 55% RH. Then, light leakage of the black display was visually observed 2 hours after the power supply was turned on to turn on the black light and evaluated the light leakage according to the following criteria.

A: No light leakage at all
B: Slight light leakage at 1 through 2 positions
C: Much light leakage at 1 through 2 positions
D: Much light leakage at three or more positions The result of this evaluation is given in Tables 2 and 3.

TABLE 3

| *1 | Composition of polarizing plates 1st (front) | | Second (rear) | Film thickness (μm) 1st | | 2nd | Polarizing plate Dimensional variation | CM (light leakage) | Variation in angle of visibility (500 h) | (1000 h) | Remarks |
|---|---|---|---|---|---|---|---|---|---|---|---|
| | | PVA | | | PVA | | Deterioration | | | | |
| 1 | 24 | P2 | 1 | 40 | 15 | 40 | A | B | A | A | A | Inv. |
| 2 | 24 | P2 | 2 | 40 | 15 | 40 | A | B | A | A | A | Inv. |
| 3 | 26 | P2 | 3 | 40 | 15 | 40 | A | B | A | A | A | Inv. |
| 4 | 16 | P2 | 4 | 40 | 15 | 40 | A | B | A | A | A | Inv. |
| 5 | 24 | P2 | 5 | 40 | 15 | 40 | A | B | A | A | A | Inv. |
| 6 | 29 | P2 | 9 | 40 | 15 | 60 | A | B | A | A | A | Inv. |
| 7 | 24 | P2 | 7 | 40 | 15 | 70 | A | B | A | A | A | Inv. |
| 8 | 24 | P2 | 3 | 40 | 15 | 40 | A | B | A | A | B | Inv. |
| 9 | 24 | P2 | 14 | 40 | 15 | 25 | A | B | A | A | A | Inv. |
| 10 | 24 | P2 | 10 | 40 | 15 | 40 | A | B | A | A | A | Inv. |
| 11 | 18 | P2 | 11 | 35 | 15 | 40 | A | B | A | A | A | Inv. |
| 12 | 24 | P2 | 12 | 40 | 15 | 40 | A | B | A | A | A | Inv. |
| 13 | 24 | P2 | 13 | 40 | 15 | 80 | A | B | A | A | A | Inv. |
| 14 | 19 | P2 | 14 | 40 | 15 | 25 | A | B | A | A | A | Inv. |
| 15 | 20 | P2 | 1 | 35 | 15 | 40 | A | B | A | A | A | Inv. |
| 16 | 1 | P2 | 1 | 40 | 15 | 40 | A | B | A | A | A | Inv. |
| 17 | 2 | P2 | 1 | 40 | 15 | 40 | A | B | A | A | A | Inv. |
| 18 | 3 | P2 | 1 | 40 | 15 | 40 | A | B | A | A | A | Inv. |
| 19 | 9 | P2 | 9 | 60 | 15 | 60 | B | B | A | A | A | Inv. |
| 20 | 3 | P2 | 3 | 40 | 15 | 40 | A | B | A | A | A | Inv. |
| 21 | 10 | P2 | 5 | 40 | 15 | 40 | A | B | A | A | A | Inv. |
| 22 | 24 | P1 | 1 | 40 | 25 | 40 | A | C | A | A | B | Inv. |
| 23 | 3 | P1 | 2 | 40 | 25 | 40 | A | C | A | A | B | Inv. |
| 24 | 25 | P2 | 1 | 80 | 15 | 40 | A | A | A | A | B | Inv. |
| 25 | 25 | P2 | 3 | 80 | 15 | 40 | A | A | A | A | B | Inv. |
| 26 | 15 | P2 | 1 | 80 | 15 | 40 | B | A | A | A | B | Inv. |
| 27 | 8 | P1 | 2 | 80 | 25 | 40 | A | B | A | A | B | Inv. |
| 28 | 21 | P2 | 1 | 80 | 15 | 40 | A | A | A | A | B | Inv. |
| 29 | 22 | P2 | 3 | 60 | 15 | 40 | A | A | A | A | A | Inv. |
| 30 | 23 | P1 | 6 | 80 | 25 | 40 | A | B | A | A | B | Inv. |
| 31 | 21 | P2 | 8 | 80 | 15 | 80 | A | A | A | A | B | Inv. |
| 32 | 25 | P2 | 13 | 80 | 15 | 80 | A | A | A | A | B | Inv. |
| 33 | 27 | P2 | 13 | 80 | 15 | 80 | A | A | A | A | B | Inv. |
| 34 | 23 | P1 | 15 | 80 | 25 | 80 | A | B | A | A | B | Inv. |
| 35 | 29 | P2 | 1 | 40 | 15 | 40 | D | E | C | C | C | Comp. |
| 36 | 30 | P2 | 3 | 40 | 15 | 40 | D | E | C | C | C | Comp. |
| 37 | 31 | P2 | 2 | 40 | 15 | 40 | D | E | C | C | C | Comp. |
| 38 | 29 | P1 | 1 | 40 | 25 | 40 | D | F | D | D | D | Comp. |
| 39 | 28 | P2 | 1 | 80 | 15 | 40 | D | D | C | D | D | Comp. |
| 40 | 28 | P2 | 3 | 80 | 15 | 40 | D | D | C | D | D | Comp. |
| 41 | 28 | P2 | 8 | 80 | 15 | 80 | D | D | C | D | D | Comp. |
| 42 | 24 | P2 | 29 | 40 | 15 | 40 | C | E | D | C | D | Comp. |
| 43 | 16 | P2 | 29 | 40 | 15 | 40 | C | E | D | C | D | Comp. |
| 44 | 1 | P2 | 29 | 40 | 15 | 40 | C | E | D | C | C | Comp. |
| 45 | 29 | P2 | 31 | 40 | 15 | 40 | D | F | D | D | D | Comp. |
| 46 | 29 | P2 | 32 | 40 | 15 | 40 | B | E | C | C | D | Comp. |

TABLE 3-continued

| | Composition of polarizing plates | | Film thickness (μm) | | | Polarizing plate | | CM (light leakage) | Variation in angle of visibility | | Re- |
|---|---|---|---|---|---|---|---|---|---|---|---|
| | 1st | Second | | | | | Dimensional | | | | |
| *1 | (front) PVA | (rear) | 1st | PVA | 2nd | Deterioration | variation | | (500 h) | (1000 h) | marks |
| 47 | 29 P2 | 33 | 40 | 15 | 40 | C | D | C | C | D | Comp. |
| 48 | 29 P2 | 34 | 40 | 15 | 40 | C | D | D | C | D | Comp. |

*1. Polarizing plate/liquid crystal apparatus number

Tables 2 and 3 show that the cellulose ester film of the present invention is characterized by excellent Rt stability at the time of humidity fluctuation, and the polarizing plate of the present invention is characterized by excellent resistance to deterioration of polarizing plate and dimensional stability. Further, it is also apparent that the liquid crystal display apparatus using the polarizing plate of the present invention is an IPS mode liquid crystal display apparatus characterized by superb resistance to light leakage and outstanding stability in the angle of visibility stability.

Example 2

The liquid crystal display apparatus was prepared according to the same manner as that of Example 1, except that the liquid crystal TV set Wooo W32-L7000 (manufactured by Hitachi Limited) as the FFS mode liquid crystal display apparatus was used instead of the liquid crystal TV set Wooo W17-LC50 (manufactured by Hitachi Limited) as the IPS mode liquid crystal display apparatus used in Example 1. They made evaluation according to the same manner as that of Example 1. As the Example 1 was reproduced, the liquid crystal display apparatus of the present invention demonstrated excellent resistance to light leakage and prominent stability in the angle of visibility.

What is claimed is:

1. A transverse electric field switch mode type liquid crystal display apparatus, comprising:
   a liquid crystal cell, and
   a polarizing plate provided on at least one side of the liquid crystal cell and including two transparent supports A and B and a polarizer sandwiched between the two transparent supports A and B;
   wherein the transparent support A is a stretched cellulose ester film which contains a polyalcohol ester plasticizer in an amount of 3 to 40% by weight to a total amount of solid content thereof and a phosphoric acid ester plasticizer in an amount less than 1% by weight, and
   wherein the transparent support B is a stretched cellulose ester film which contains a polymer obtained by polymerization of an ethylenic unsaturated monomer having a weight average molecular weight of from 500 to 30000 and has a retardation value $R_0$ of from 0 nm to 10 nm and a retardation value $R_t$ of from −30 nm to 20 nm, and the retardation value $R_0$ and the retardation value $R_t$ are defined by the following formulas (I) and (II):

$$R_0=(nx-ny)\times d \qquad \text{Formula (I)}$$

$$R_t=\{(nx+ny)/2-nz\}\times d \qquad \text{Formula (II)}$$

where nx represents a refractive index in a slow phase axis direction in a film plane, ny represents a refractive index in a fast phase axis direction in the film plane, nz represents the refractive index in a film thickness direction, and d represents a film thickness (nm).

2. The transverse electric field switch mode type liquid crystal display apparatus of claim 1, wherein the retardation value $R_0$ is from 0 nm to 5 nm and the retardation value $R_t$ is from −10 nm to 10 nm.

3. The transverse electric field switch mode type liquid crystal display apparatus of claim 1, wherein the polymer is an acryl type polymer having a weight average molecular weight of from 500 to 30000.

4. The transverse electric field switch mode type liquid crystal display apparatus of claim 3, wherein the acryl type polymer contains an acrylate methyl ester monomer unit in the range of 30% by mass or more.

5. The transverse electric field switch mode type liquid crystal display apparatus of claim 3, wherein the acryl type polymer contains an acrylate having a hydroxyl group or a methacrylic acid ester monomer unit in the range of from 2 to 20% by mass.

6. The transverse electric field switch mode type liquid crystal display apparatus of claim 3, wherein the acryl type polymer has a hydroxyl group on at least one terminal of a main chain.

7. The transverse electric field switch mode type liquid crystal display apparatus of claim 3, wherein the acryl type polymer contains two types of polymers, a polymer X and a polymner Y,
   wherein the polymer X is obtained by copolymerization between an ethylenic unsaturated monomer Xa not containing an aromatic ring and a hydrophilic group in a molecule thereof and an ethylenic unsaturated monomer Xb not containing an aromatic ring and containing a hydrophilic group in a molecule thereof and has a weight average molecular weight of 5,000 to 30,000, and
   wherein the polymer Y is obtained by polymerization of an ethylenic unsaturated monomer Ya not containing an aromatic ring in a molecule thereof and has a weight average molecular weight of 500 to 3,000.

8. The transverse electric field switch mode type liquid crystal display apparatus of claim 1, wherein the transparent support A further contains at least one of a polyvalent carboxylic acid ester plasticizer, a glycolate plasticizer, a phthalic acid ester plasticizer, a fatty acid ester plasticizer, a polyester plasticizer, and a polymer plasticizer.

9. The transverse electric field switch mode type liquid crystal display apparatus of claim 1, wherein the transparent support B contains at least one kind selected from a group consisting of a polyvalent alcohol ester plasticizer, a polyester plasticizer and an acryl polymer plasticizer.

10. The transverse electric field switch mode type liquid crystal display apparatus of claim 1, wherein the transparent supports A and B have a film thickness of 10 μm to 70 μm respectively.

11. The transverse electric field switch mode type liquid crystal display apparatus of claim 1, wherein the transparent support B of the polarizing plate is pasted onto the liquid crystal cell and the transparent support A is coated with at least one of an actinic radiation curable resin and an antireflection layer.

* * * * *